US012593940B2

(12) United States Patent
McClean et al.

(10) Patent No.: US 12,593,940 B2
(45) Date of Patent: Apr. 7, 2026

(54) TOASTER

(71) Applicant: BREVILLE PTY LIMITED, Alexandria (AU)

(72) Inventors: Stephen John McClean, Alexandria (AU); Johnson Thie, Alexandria (AU); Duncan Bruce Hellmers, Alexandria (AU); Ali Tofaili, Alexandria (AU); Alastair Leonard Dover, V, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 857 days.

(21) Appl. No.: 17/759,552

(22) PCT Filed: Jan. 28, 2021

(86) PCT No.: PCT/AU2021/050048
§ 371 (c)(1),
(2) Date: Jul. 27, 2022

(87) PCT Pub. No.: WO2021/151147
PCT Pub. Date: Aug. 5, 2021

(65) Prior Publication Data
US 2023/0090991 A1      Mar. 23, 2023

(30) Foreign Application Priority Data

Jan. 30, 2020    (AU) ................................ 2020900250

(51) Int. Cl.
| | |
|---|---|
| *A47J 37/08* | (2006.01) |
| *F24C 7/06* | (2006.01) |
| *H05B 1/02* | (2006.01) |
| *H05B 3/00* | (2006.01) |
| *H05B 3/06* | (2006.01) |

(Continued)

(52) U.S. Cl.
CPC ....... *A47J 37/0807* (2013.01); *A47J 37/0835* (2013.01); *A47J 37/085* (2013.01);
(Continued)

(58) Field of Classification Search
CPC ... F24C 7/06; F24C 7/065; A47J 37/08; A47J 37/0807; A47J 37/0835; A47J 37/085;
(Continued)

(56) References Cited

U.S. PATENT DOCUMENTS

| | | | |
|---|---|---|---|
| 1,480,084 A | 1/1924 | Lamb | |
| 1,884,825 A | 10/1932 | Joseph | |

(Continued)

FOREIGN PATENT DOCUMENTS

| | | |
|---|---|---|
| GB | 1149333 A | 4/1969 |
| WO | WO-2020168038 A1 | 8/2020 |

OTHER PUBLICATIONS

Supplementary Partial European Search Report for Application No. 21747416.2 dated Dec. 4, 2023.
(Continued)

*Primary Examiner* — Hung D Nguyen
(74) *Attorney, Agent, or Firm* — MOSER TABOADA

(57) ABSTRACT

A toaster heating assembly (55A, 55B) including: a frame (60); a panel (65) at least partly supported by the frame (60); a spacer (80) mounted to the panel (65); and an elongate heating element (93) having a plurality of spaced apart elongate heating element portions (95) supported by the spacer (80), so that the spacer (80) is located between the plurality of heating element portions (95) and the panel (65) to provide a gap (94) between the plurality of heating element portions (95) and the panel (65).

13 Claims, 21 Drawing Sheets

(51) Int. Cl.
H05B 3/24 (2006.01)
*G01J 5/00* (2022.01)
*G01J 5/068* (2022.01)
*G01J 5/10* (2006.01)

(52) U.S. Cl.
CPC ............ F24C 7/06 (2013.01); H05B 1/0261
(2013.01); H05B 3/0004 (2013.01); H05B
3/06 (2013.01); H05B 3/24 (2013.01); *G01J*
*5/0044* (2013.01); *G01J 2005/0077* (2013.01);
*G01J 5/068* (2022.01); *G01J 2005/106*
(2013.01)

(58) Field of Classification Search
CPC . A47J 37/0857; H05B 1/0261; H05B 3/0004;
H05B 3/06; H05B 3/16; H05B 3/24;
G01J 2005/0077; G01J 2005/106; G01J
5/0044; G01J 5/0077
See application file for complete search history.

(56) References Cited

U.S. PATENT DOCUMENTS

| | | | | |
|---|---|---|---|---|
| 2,493,542 | A | 1/1950 | Max | |
| 2,599,038 | A | 6/1952 | Aske | |
| 2,747,072 | A | 5/1956 | Lawser | |
| 2,877,702 | A | 3/1959 | Roger | |
| 3,392,663 | A | 7/1968 | Williams | |
| 3,870,863 | A * | 3/1975 | Ohnmacht | H05B 3/16 219/552 |
| 2014/0352549 | A1* | 12/2014 | Upston | A47J 37/0857 99/334 |

OTHER PUBLICATIONS

International Search Report for application No. PCT/AU2021/050048, dated Mar. 31, 2021.

* cited by examiner

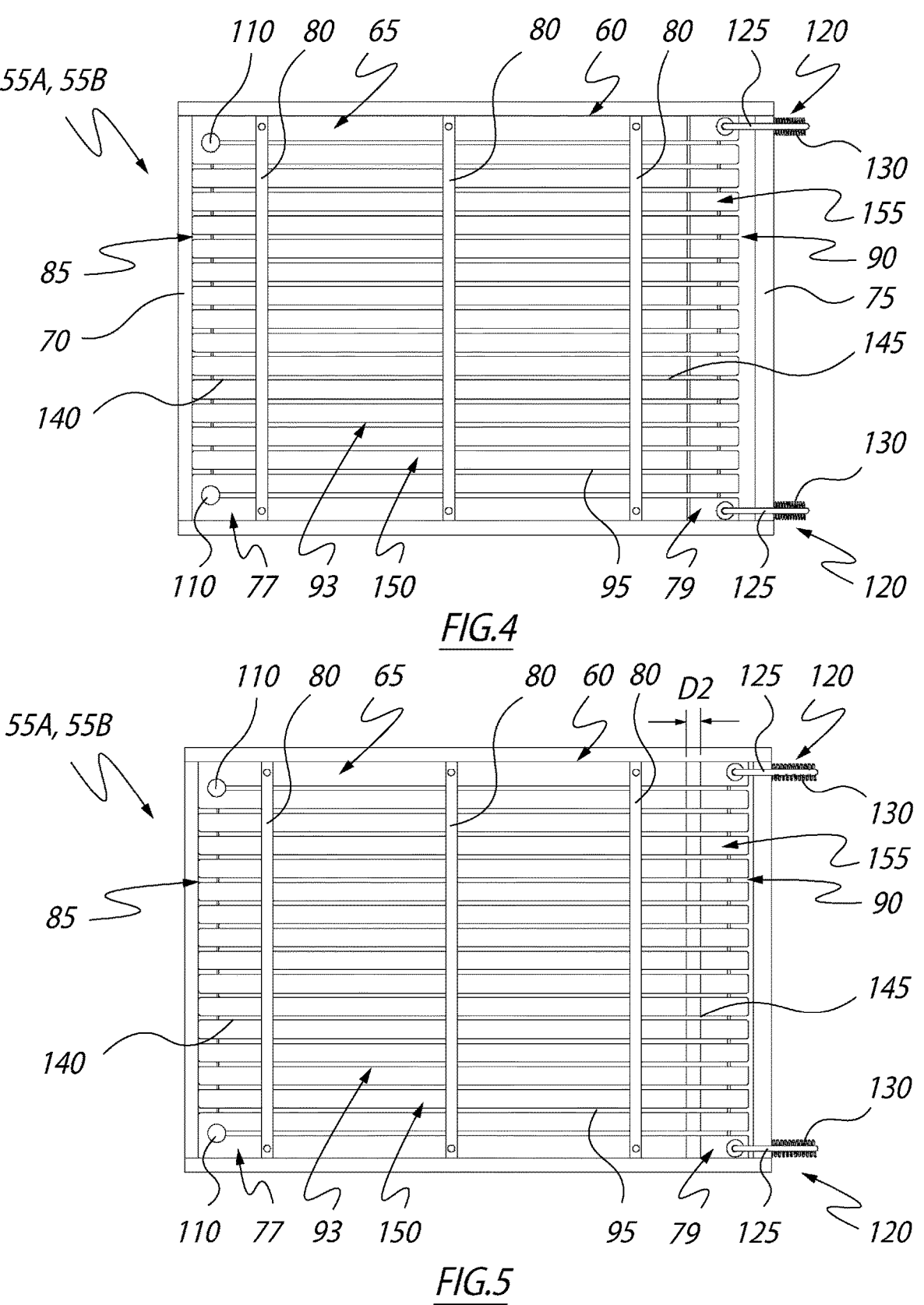
_FIG.4_
_FIG.5_

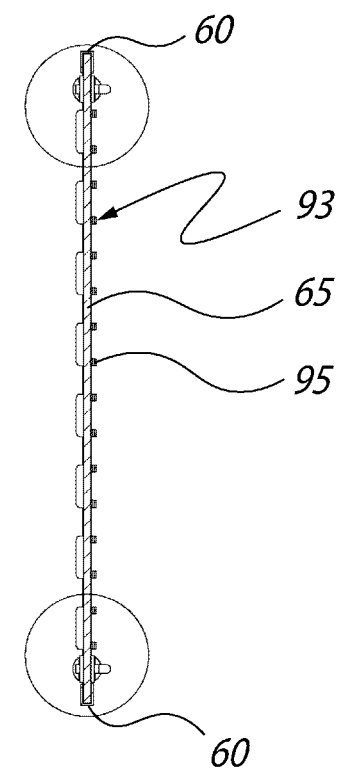
*FIG.10*
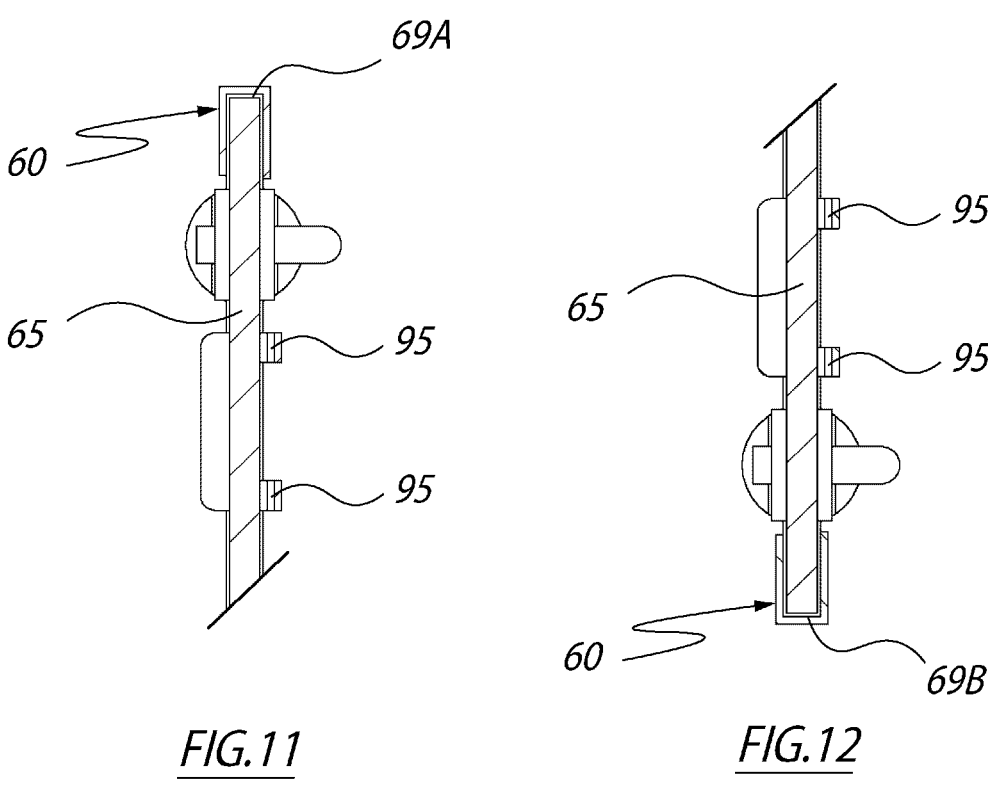
*FIG.11*          *FIG.12*

225

210

235

250

230

225

210

250

TOASTER

FIELD

The present invention relates to a toaster, and more particularly to a toaster heating assembly and a toaster sensor assembly.

The invention has been developed primarily for use as a bread toaster and will be described hereinafter with reference to this application. However, it will be appreciated that the invention is not limited to this particular field of use.

BACKGROUND

Conventional toasters have heating elements in the form of a nichrome wire that is wound around and crimped against a mica sheet. A disadvantage of this arrangement is that the mica sheet may undesirably act as a heat sink that draws heat away from the nichrome wire, which may result in slower heat-up time. The nichrome wire expands as it heats up, and due to the nichrome wire being crimped against the mica sheet, the expansion of the nichrome wire results in the nichrome wire deforming by flexing or bending away from the sheet at various locations. The temperature of the nichrome wire will thus be higher at these locations, whilst being cooler at the locations where the wire still contacts the mica sheet. A further disadvantage of the above arrangement is that the deformation of the nichrome wire from repeated expansion and contraction may result in fatigue of the wire over time, and the structure of the wire may deteriorate.

Conventional toasters also include sensors to detect a temperature of foodstuff being cooked in the toasting cavity. However, conventional toaster sensors are typically mounted inside the toasting cavity, which subjects the sensors to high temperatures from the heating elements. Further, such toaster sensors are typically placed behind a mica sheet but still require an unobstructed field of view into the toasting cavity to detect the temperature of the foodstuff. As such, an opening or cut-out is required in the mica sheet to accommodate the sensor field of view. Such openings or cut-outs typically create cool zones on the mica sheet, which leads to uneven distribution of heat to the foodstuff. Additionally, conventional toaster sensors are susceptible to build-up of particles (for example, crumbs or debris from the foodstuff) as they are located in the toasting cavity. Conventional toasters may also require multiple sensors to accurately detect the temperature of the foodstuff.

SUMMARY

It is an object of the present invention to substantially overcome, or at least ameliorate, one or more of the disadvantages of existing arrangements, or at least provide a useful alternative to existing arrangements.

There is disclosed herein a toaster heating assembly including:

a frame;

a panel at least partly supported by the frame;

a spacer mounted to the panel; and an elongate heating element having a plurality of spaced apart elongate heating element portions supported by the spacer, so that the spacer is located between the plurality of heating element portions and the panel to provide a gap between the plurality of heating element portions and the panel.

Preferably, the toaster heating assembly includes a biasing member to provide tension to the heating element.

Preferably, the biasing member includes a tensioning arm and a spring.

Preferably, the heating element includes a first side portion mounted to the panel and a second side portion that is moveable relative to the first end portion, and the biasing member preferably extends between the second end portion and one side of the frame so as to bias the second end portion towards said frame side.

Preferably, the panel includes a major panel portion to which the first side portion of the heating element is mounted, and a minor panel portion to which the second side portion of the heating element is mounted, with the major panel portion being fixed relative to said frame side and the minor panel portion being moveable relative to said frame side to vary a distance between the major panel portion and the minor panel portion.

Preferably, the panel includes opposing end portions, each end portion having a plurality of spaced apart openings within which the heating element portions are mounted.

Preferably, the frame includes an elongate inner channel to receive a portion of the minor panel portion to guide the movement of the minor panel portion relative to the frame.

There is also disclosed herein a toaster including:

a housing having a cavity;

a toaster sub-assembly located in the cavity, the sub-assembly including:

a pair of opposing heating element assemblies that are spaced so as to provide a toasting area within the cavity for receiving foodstuff to be toasted; and a carriage moveable between the opposing heating element assemblies and to support the foodstuff received in the toasting area, the carriage being moveable between a lowered toasting position and raised inspection position relative to the heating element assemblies; and a sensor assembly located away from the toasting area and including a sensor device to detect a surface temperature of the foodstuff supported by the carriage when the carriage is in the raised inspection position.

There is also disclosed herein a toaster including:

a housing having a cavity; and a toaster sub-assembly located in the cavity, the sub-assembly including:

a pair of opposing heating element assemblies that are spaced so as to provide a toasting area within the cavity for receiving foodstuff to be toasted; and a carriage moveable between the opposing heating element assemblies and to support the foodstuff received in the toasting area, the carriage being moveable between a lowered toasting position and raised inspection position relative to the heating element assemblies; and a sensor assembly located above the toasting area and including a sensor device to detect a surface temperature of the foodstuff supported by the carriage when the carriage is in the raised inspection position.

Preferably, the toaster includes two toaster sub-assemblies and a microprocessor to enable the movement of the carriages between the lowered toasting position and the raised inspection position, whereby the microprocessor is programmable to stagger the movement of the carriages from the lowered position to the raised position.

BRIEF DESCRIPTION OF THE DRAWINGS

Preferred embodiments of the present invention will be described by way of example only, with reference to the accompanying drawings, in which:

FIG. 4 is a schematic front view of the toaster heating sub-assembly of FIG. 3 in a first state;

FIG. 5 is a schematic front view of the toaster heating sub-assembly of FIG. 3 in a second state;

FIG. 10 is a schematic side view of the toaster heating sub-assembly of FIG. 3;

FIG. 11 is an enlarged view of a portion of the toaster heating sub-assembly of FIG. 10;

FIG. 12 is an enlarged view of a further portion of the toaster heating sub-assembly of FIG. 10;

DETAILED DESCRIPTION OF THE EMBODIMENTS

Toaster Heating Element Assembly

Figure 1:
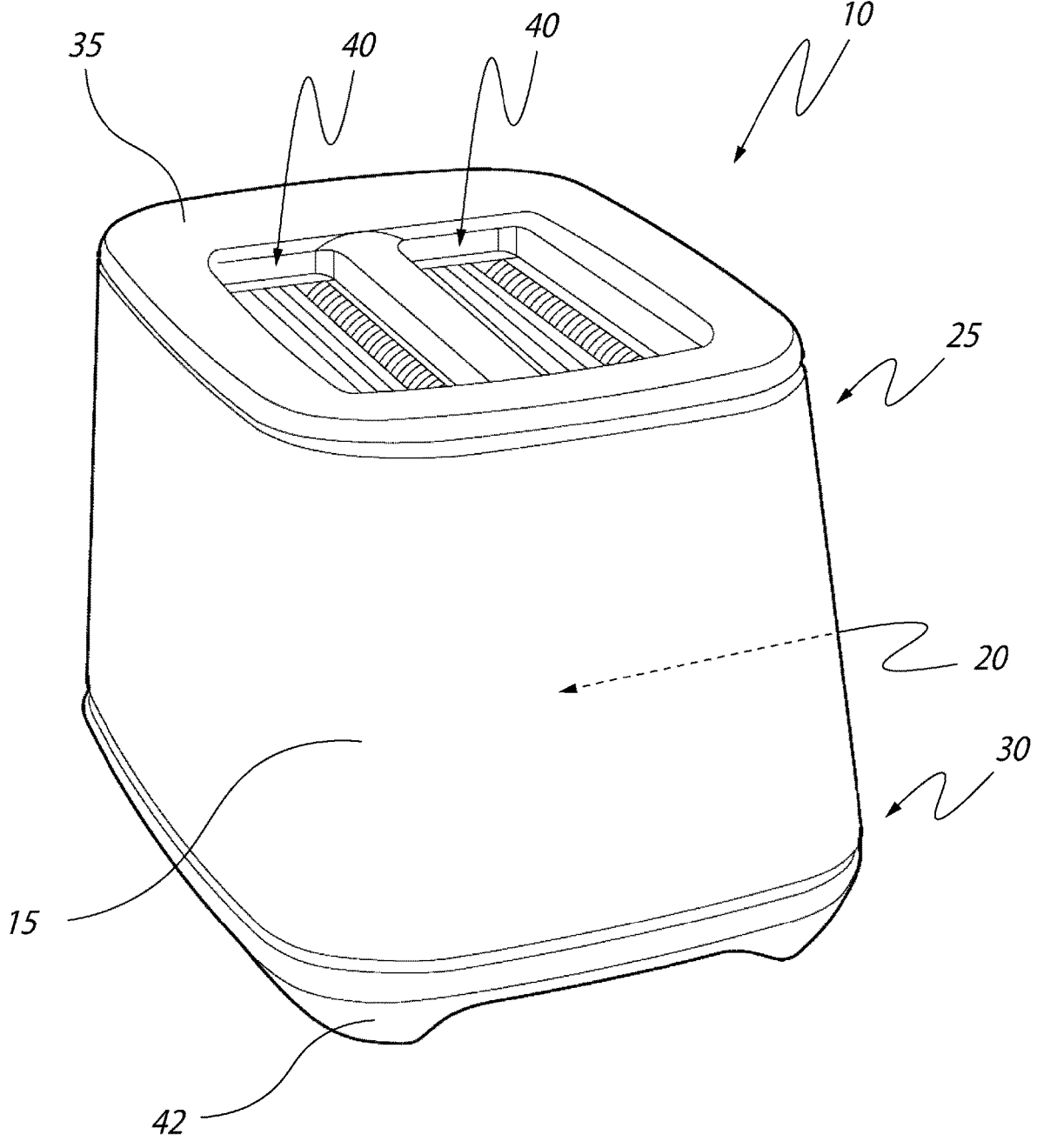
FIG. 1 is a schematic isometric view of a toaster.

In FIG. 1 of the accompanying drawings, there is schematically depicted a toaster 10 including a housing 15 that surrounds an interior cavity 20. The interior cavity 20 houses a number of components for receiving and toasting foodstuff. For the purpose of this specification, it will be understood that a wide variety of foodstuff may be cooked in the toaster 10. Such foodstuff may include sliced breads, bagels, crumpets, and pastries, as well as frozen versions of such foodstuffs. Throughout the specification, the term "foodstuff" will be used to designate any of these unless otherwise specified.

The housing 15 of the toaster 10 includes an upper portion 25 and a lower portion 30. The toaster 10 is further provided with a top cap 35 located adjacent the upper portion 25 of the housing 15. The top cap 35 provides an upper surface of the toaster 10. In the depicted embodiment, the top cap 35 includes two openings (slots) 40, with each opening 40 providing access into the interior cavity 20. However, in other embodiments (not shown), it will be appreciated that the top cap 35 may include only one opening or slot 40, or more than two openings or slots 40, depending on the design requirements of the toaster 10. It will be appreciated that the openings or slots 40 may have any dimension or shape that is suitable for the design requirements of the toaster 10. In the depicted embodiment, the two slots 40 are rectangular slots having the same dimensions, although the slots 40 may alternatively have two different sizes or shapes.

The toaster 10 is also further provided with a base member 42 located adjacent the lower portion 30 of the housing 15. A removable crumb tray (not shown) may be mounted to the base member 42 to collect crumbs or debris that are deposited by the foodstuff received in the interior cavity 20.

Figure 2:
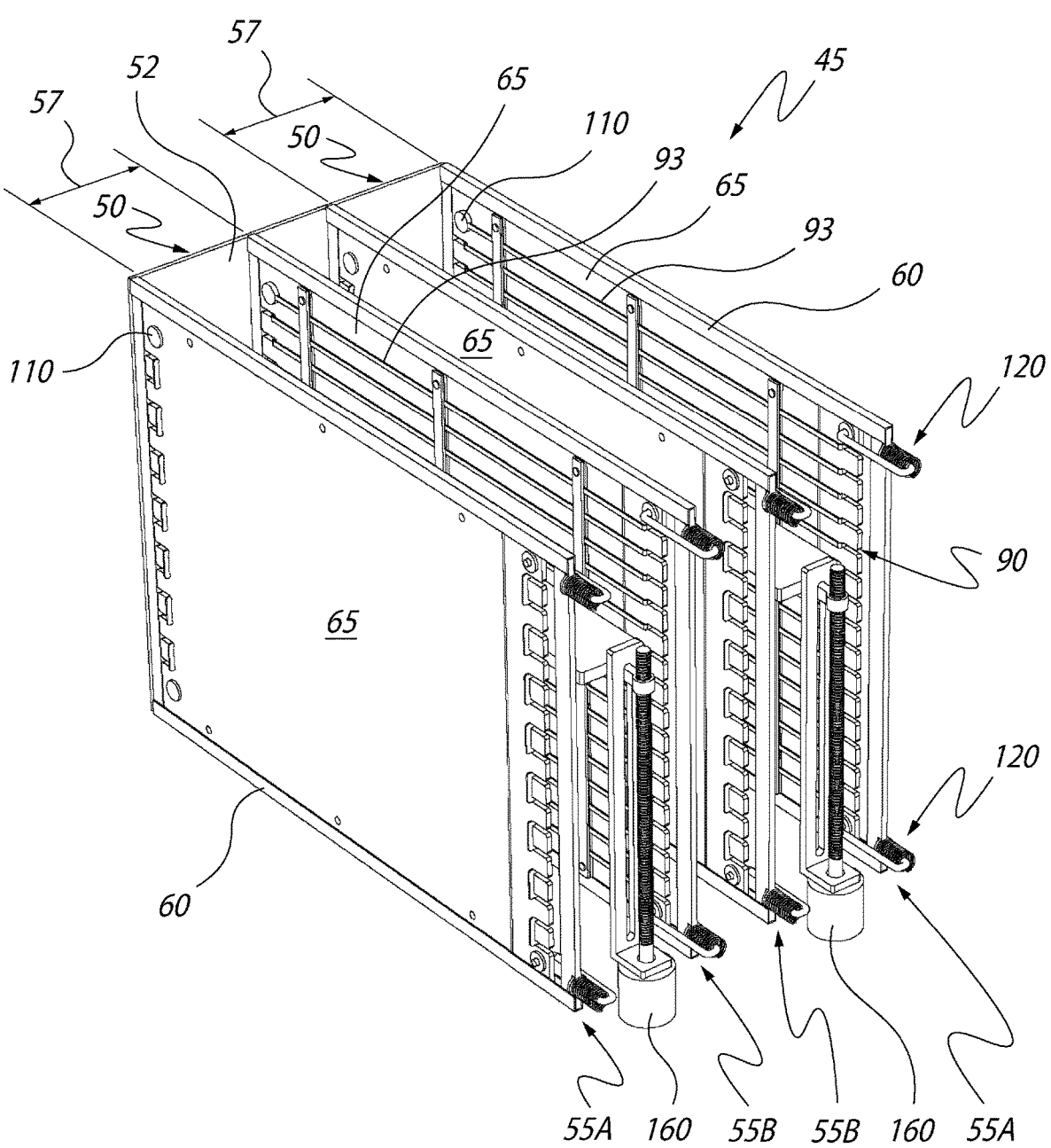
FIG. 2 is a schematic isometric view of a toaster heating assembly of the toaster of FIG. 1.

Referring to FIG. 2, the toaster 10 further includes a toaster heating assembly 45, which is located in the interior cavity 20. It would be understood that the toaster heating assembly 45 is mounted within the interior cavity 20 of the toaster 10, and preferably mounted (either directly or indirectly) to the housing 15. The toaster heating assembly 45 may alternatively be mounted to the base member 42.

In the depicted embodiment, the toaster heating assembly 45 includes two sub-assemblies 50 to complement the two slots 40. It will be appreciated that in other embodiments (not shown), the toaster heating assembly 45 may include only one sub-assembly 50, or more than two sub-assemblies 50, to match the number of slots 40 provided by the top cap 35.

In the depicted embodiment, the two sub-assemblies 50 are supported by an end panel 52. Each sub-assembly 50 includes a pair of opposing heating element assemblies provided by a first heating element assembly 55A and a second heating element assembly 55B. In the depicted embodiment, the toaster heating assembly 45 is provided with two spaced apart sub-assemblies 50 which together provide two opposing first heating element assemblies 55A at an outer area of the toaster heating assembly 45, and two opposing second heating element assemblies 55B at an inner area of the toaster heating assembly 45. The two second heating element assemblies 55B are thus spaced apart and located adjacent to each other, whilst the two first heating element assemblies 55A are located towards the housing 15 and spaced from the respective sides of the two second heating element assemblies 55B.

For each sub-assembly 50, the first heating element assembly 55A and the second heating element assembly 55B are spaced by a distance 57 so as to provide a toasting area 58 (see FIGS. 13 and 14) within the interior cavity 20 for receiving the foodstuff to be toasted.

Figure 3:
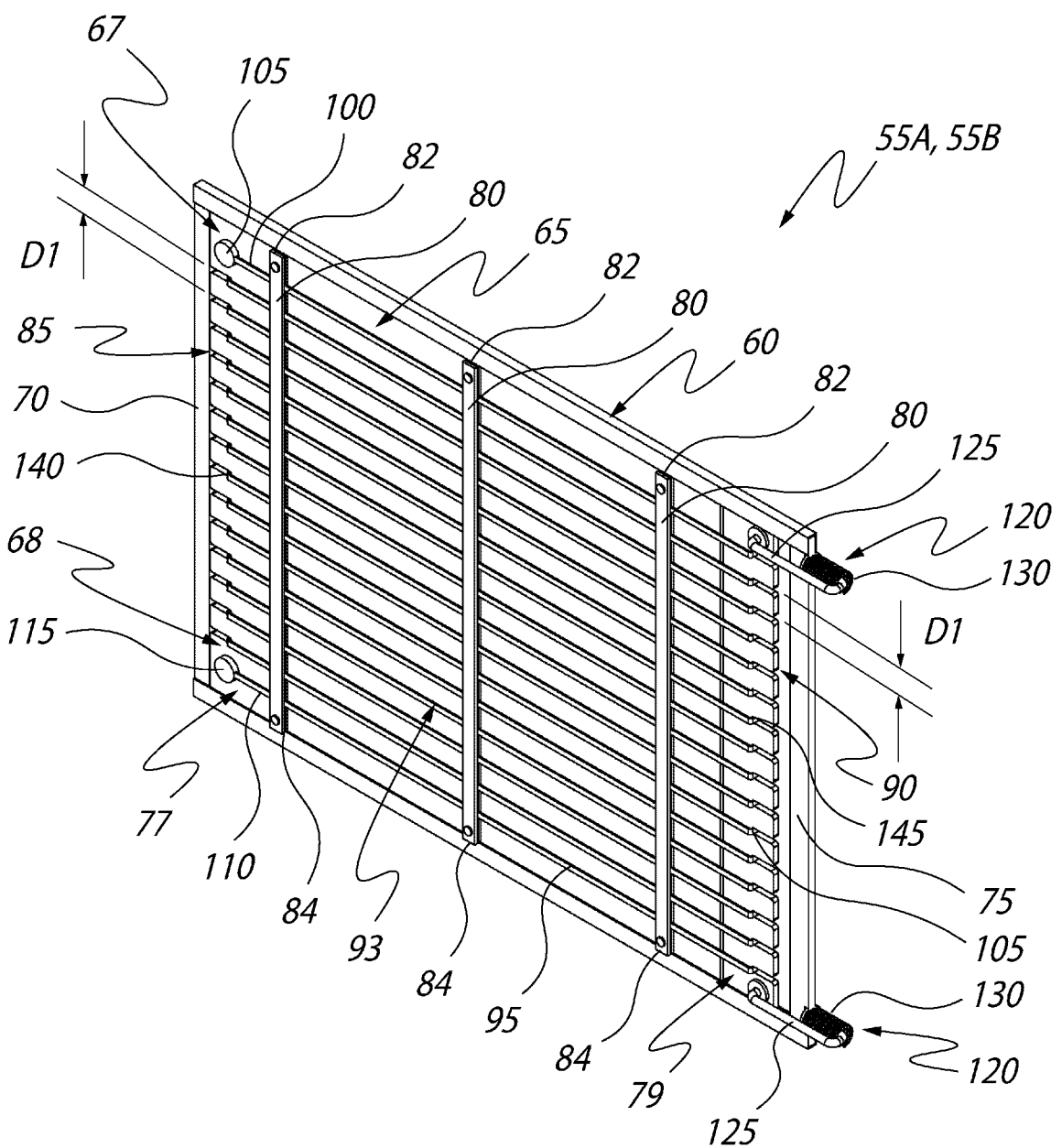
FIG. 3 is a schematic isometric view of a toaster heating sub-assembly.
Figure 6:
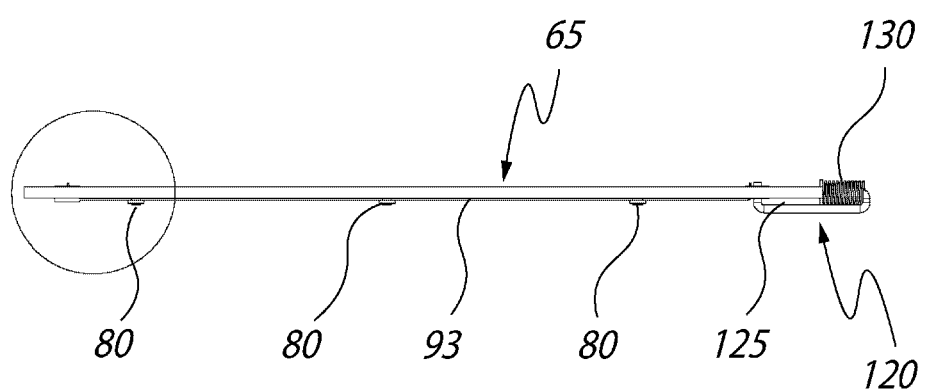
FIG. 6 is a schematic top view of the toaster heating sub-assembly of FIG. 3.

As best shown in FIG. 3, the first and second heating element assemblies 55A and 55B each include a frame 60 and a panel 65 at least partly supported by the frame 60. The panel 65 may be in the form of a sheet of mica, for example. In the depicted embodiment, the panel 65 has an upper portion 67 and a lower portion 68, and the frame 60 supports the panel 65 at both the upper and lower portions 67 and 68. In other embodiments (not shown), the frame 60 may support the panel 65 solely at the upper portion 67 or solely at the lower portion 68. In the depicted embodiment, the frame 60 includes an upper elongate channel 69A (see FIG. 11) within which the upper portion 67 is mounted, and a lower elongate channel 69B (see FIG. 12) within which the lower portion 68 is mounted. In other embodiments (not shown), it is envisaged that the panel 65 may be supported by the frame 60 via alternative fixation or coupling means.

The frame 60 also includes a first frame side portion 70 and a second, opposing frame side portion 75 that is spaced from the first frame side portion 70. The panel 65 also includes a first panel side portion 77 located adjacent the first frame side portion 70 and a second panel side portion 79 located adjacent the second frame side portion 75.

The first and second heating element assemblies 55A and 55B each further include at least one spacer assembly 80. In the depicted embodiment, the first and second heating element assemblies 55A and 55B include three spacer assemblies 80 mounted to the panel 65, with the three spacer assemblies 80 being spaced apart and arranged parallel to one another. However, it will be appreciated that in other embodiments (not shown), the first and second heating element assemblies 55A and 55B may include any number of spacer assemblies 80 to suit the design requirements of the toaster 10. Each spacer assembly 80 includes an inner spacer 81A and an outer spacer 81B (see FIG. 7). The inner and outer spacers 81A and 81B may be mounted to the panel 65 by way of one or more rivets, or any alternative mounting means. In the depicted embodiment, each spacer assembly 80 is elongate and has a first end portion 82 mounted at the upper portion 67 of the panel 65 and second end portion 84 mounted at the lower portion 68 of the panel 65. Accordingly, in the preferred form, the spacer assemblies 80 are arranged vertically, and generally parallel to the first and second frame side portions 70 and 75.

The first panel side portion 77 includes a first plurality of spaced apart openings 85, and the second panel side portion 79 includes a second plurality of spaced apart openings 90 that are in alignment with the spaced apart openings 85. In a preferred form, the openings 85 are evenly spaced apart from one another by a distance D1 as shown in FIG. 3, and likewise the openings 90 are evenly spaced apart from one another by the corresponding distance D1.

Figure 7:
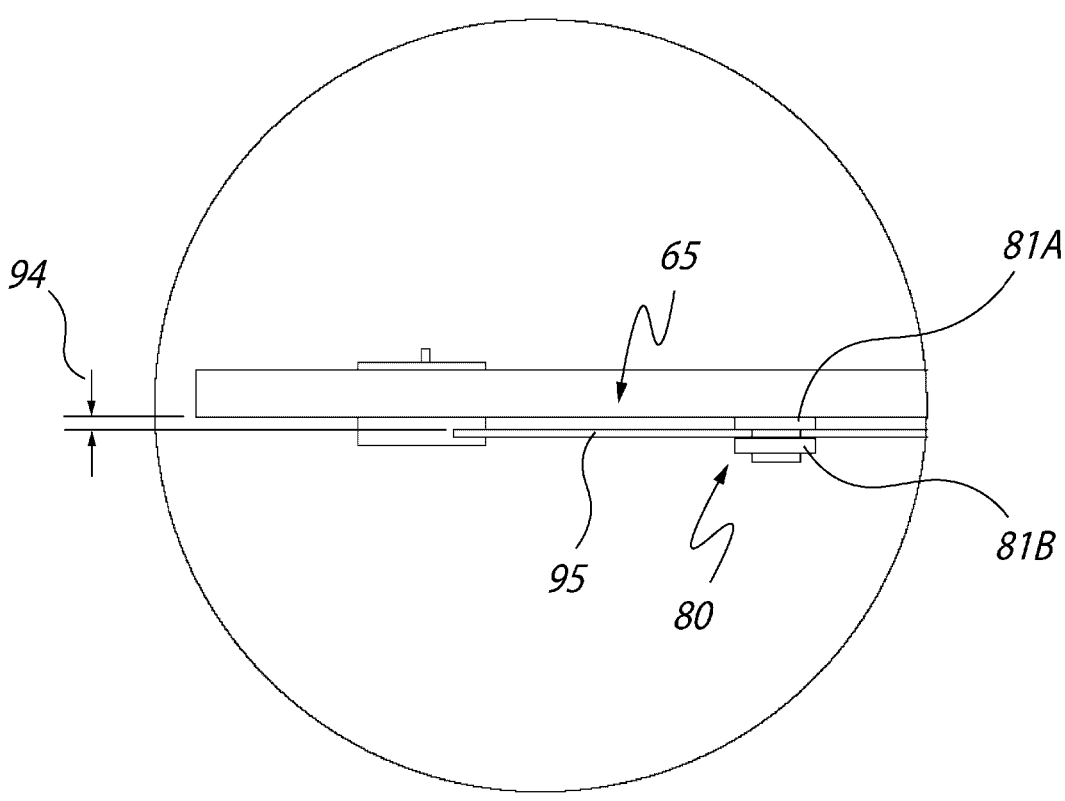
FIG. 7 is an enlarged view of a portion of the toaster heating sub-assembly of FIG. 6.

The first and second heating element assemblies 55A and 55B each further include a single, continuous heating element 93. The heating element 93 may be in the form of a nichrome wire, for example. In the depicted embodiment, the heating element 93 is wrapped or wound around the panel 65 to create a plurality of parallel and spaced apart elongate heating element portions 95. In the depicted embodiment, and as best shown in FIG. 7, the heating element portions 95 are at least partly supported by the spacer assemblies 80 so that the inner spacer 81A is located between the heating element portions 95 and the panel 65 to provide a gap 94 therebetween, and the outer spacer 81B helps to retain the heating element portions 95 in place. It will be appreciated that this gap 94 is provided as an air gap between the heating element portions 95 and the panel 65, and at least prevents the bulk of the heating element 93 from contacting the panel 65 and losing heat from heat transfer to the panel 65. This arrangement may also at least facilitate an even heat distribution across the expanse of the heating element 93 provided by the heating element portions 95. The plurality of heating element portions 95 are arranged transversely, and preferably orthogonally, with respect to the vertically arranged spacer assemblies 80. It will also be understood that the upper and lower spacers 81A and 81B support, but do not necessarily grip or clamp the heating element portions 95, thus allowing the heating element portions 95 to slide freely between the upper and lower spacers 81A and 81B as they expand and contract from heating up and cooling down.

The elongate heating element portions 95 are also preferably evenly spaced apart from one another by the distance D1, and are arranged parallel to one another in the preferred form. In the embodiment depicted in FIG. 3, the second panel side portion 79 includes sixteen (16) openings 90, which correspond to the number of heating element portions 95 provided by the heating element 93.

In other embodiments (not shown), it will be appreciated that the first and second heating element assemblies 55A and 55B may each include a further panel (not shown) at least partly supported by the frame 60, and arranged to cover the spacer assemblies 80. In such embodiments, the outer spacer 81B would have the same function as the inner spacer 81A by providing a gap between the further panel and the heating element portions 95. The further panel may additionally retain the heating element portions 95 in place.

The single, continuous heating element 93 includes a first end portion 100 that is mounted to the panel 65 at a first (upper) electrical connection point 105 and a second end portion 110 that is mounted to the panel at a second (lower) electrical connection point 115. The electrical connection points 105 and 115 provide the means by which the heating element 93 is energised.

As best shown in FIGS. 3 and 10, the single, continuous heating element 93 is wound around the panel 65 so as to extend from the first end portion 100 mounted to the first electrical connection point 105, horizontally across the breadth of the panel 65, into an uppermost opening of the plurality of openings 90, then vertically down and into an opening below the uppermost opening of the plurality of openings 90, then returning across the breadth of the panel 65 and into an uppermost opening of the plurality of openings 85. This continues down the panel 65 in the same pattern until the second end portion 110 may be mounted to the second electrical connection point 115. The heating element 93 is thus mounted within the respective openings 85 and 90 as it is wrapped or wound around the first and second side portions 77 and 79 of the panel 65, and to provide the parallel heating element portions 95. The heating element 93 may be crimped or bent within the openings 85 and 90.

Figure 8:
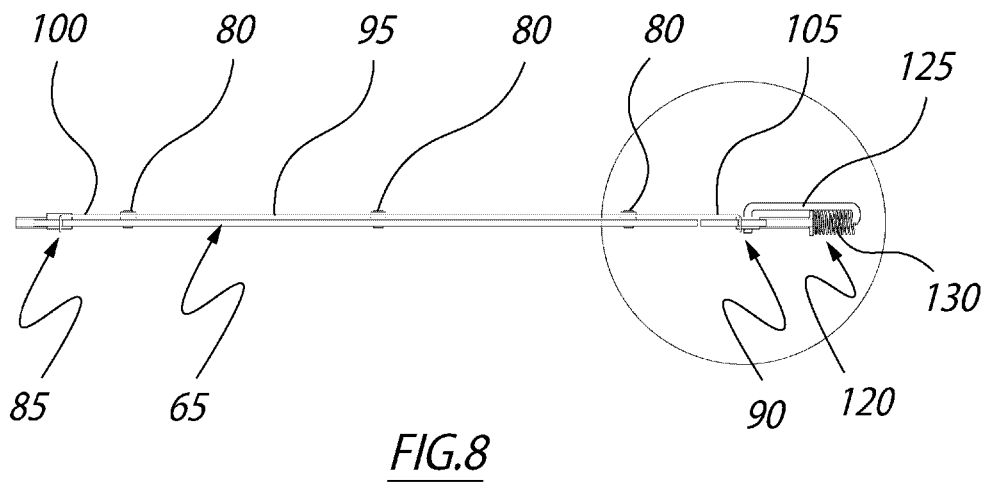
FIG. 8 is a further schematic top view of the toaster heating sub-assembly of FIG. 3.
Figure 9:
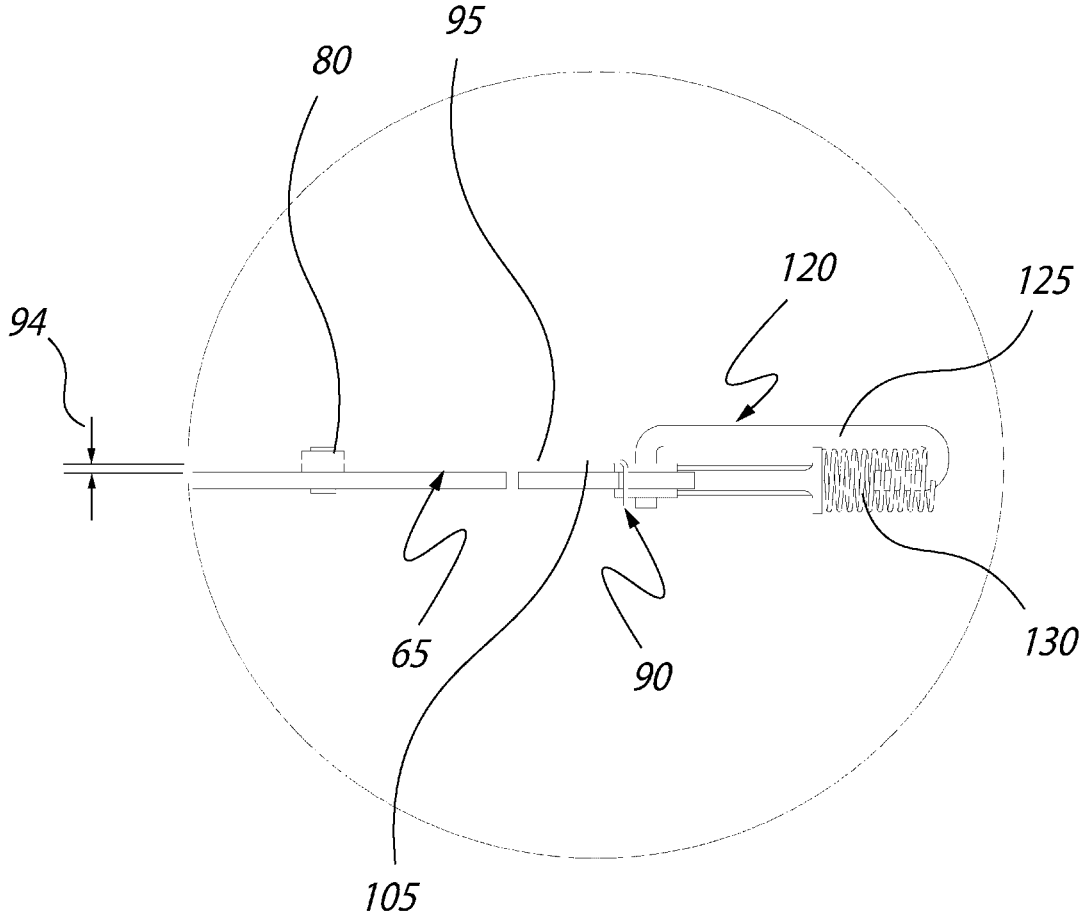
FIG. 9 is an enlarged view of a portion of the toaster heating sub-assembly of FIG. 8.

In some embodiments, and as best shown in FIGS. 3, 8 and 9, the first and second heating element assemblies 55A and 55B each further include two biasing members 120 adapted to provide tension to the heating element 93. One of the biasing members 120 may be located adjacent the upper portion 67 of the panel 65, whilst the other biasing member 120 may be located adjacent the lower portion 68 of the panel 65. In the depicted embodiment, the biasing members 120 are each provided by a tensioning arm 125 and a spring 130, although it is envisaged that the biasing member 120 may alternatively be formed of a single, unitary component. It will further be understood that in other embodiments (not shown), the first and second heating element assemblies 55A and 55B may each alternatively be provided with only one or more than two biasing members 120 to suit design requirements.

Returning to FIG. 3, the heating element 93 further includes a first element side portion 140 provided by the collective the heating element portions 95 mounted within the openings 65, and a second element side portion 145 provided by the collective the heating element portions 95 mounted within the openings 90.

Referring to FIGS. 4 and 5, the first element side portion 140 is mounted to the panel 65 at the openings 85 and the second element side portion 145 is moveable relative to the first end portion 140. The biasing member 120 extends between the second element side portion 145 and the second frame side portion 75 so as to bias the second element side portion 145 towards the second frame side portion 75.

The panel 65 also further includes a major panel member 150 to which the first element side portion 140 of the heating element 93 is mounted, and a minor panel member 155 to which the second element side portion 145 of the heating element 93 is mounted. The major panel member 150 is fixed relative to the first frame side portion 70, and the minor panel portion 155 is moveable relative to the first frame side portion 70 to vary a distance D2 (see FIG. 5) between the major panel member 150 and the minor panel member 155. It will be appreciated that the upper and lower elongate channels 69A and 69B provide a linear guide within which the minor panel member 155 may move.

FIG. 4 depicts a "cold" state of the heating element 93 in which the heating element 93 is unexpanded, whilst FIG. 5 depicts a "hot" state of the heating element 93 in which the heating element 93 is expanded from being heated. It is therefore clear that as the heating element 93 deforms by expansion from being heated, the biasing members 120 also deform to accommodate the travel of the minor panel portion 155 relative to the major panel portion 150. That is, the tensioning arm 125 and the spring 130 of each biasing member 120 provides tension to take up slack in the heating element 93 caused by the expansion of the heating element 93 from being heated. It will be understood that the arrangement of the biasing members 120 may at least allow the heating element portions 95 to be maintained parallel to one another (and also parallel to the frame 65) whilst the minor panel member 155 is moving or travelling relative to the major panel member 150 as the heating element 93 expands from being heated. Likewise, when the heating element 93 contracts or shrinks from being cooled, the biasing member 120 also relaxes to allow the heating element portions 95 to be maintained parallel to one another whilst the minor panel member 155 is moving or travelling towards the major panel member 150. It will thus be appreciated that the biasing members 120 allow for tensile forces (tension) in the heating element 93 to remain constant during expansion or contraction. Additionally, as the heating element portions 95 are spaced from the panel 65 by the gap 94 and free to slide between the inner and outer spacers 81A and 81B, the heating element 93 is free to expand and contract as it is heated and cooled, thus placing less stress on the heating element 93 (which may otherwise result from bowing and flexing from being fixed to the panel) and allowing for an even distribution of heat across the expanse of the heating element 93.

Figure 13:
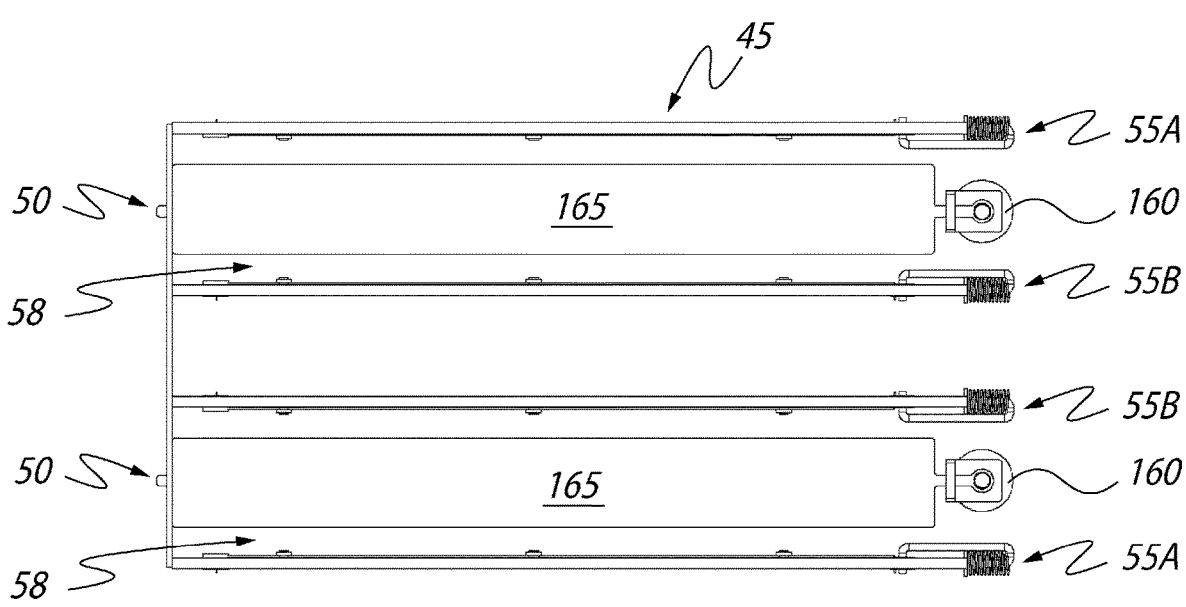
FIG. 13 is a schematic top view of the toaster heating assembly of FIG. 2.
Figure 14:
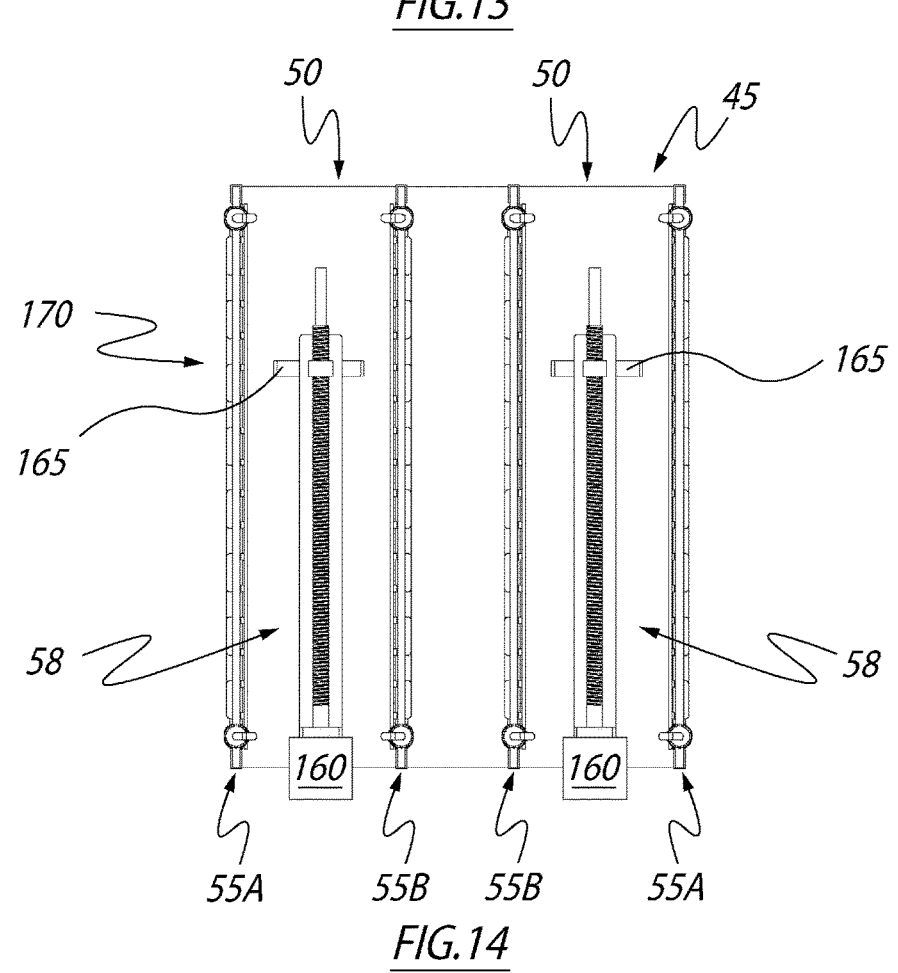
FIG. 14 is a schematic side view of the toaster heating assembly of FIG. 2.

Referring to FIGS. 2, 13 and 14, the toaster heating assembly 45 also includes a motor 160 to drive vertical movement of a carriage 165 (discussed in further detail below) within the sub-assemblies 50. FIG. 14 shows an exemplary embodiment of the toaster heating assembly 45 with the carriage 165 in a raised position 170.

Figure 15:
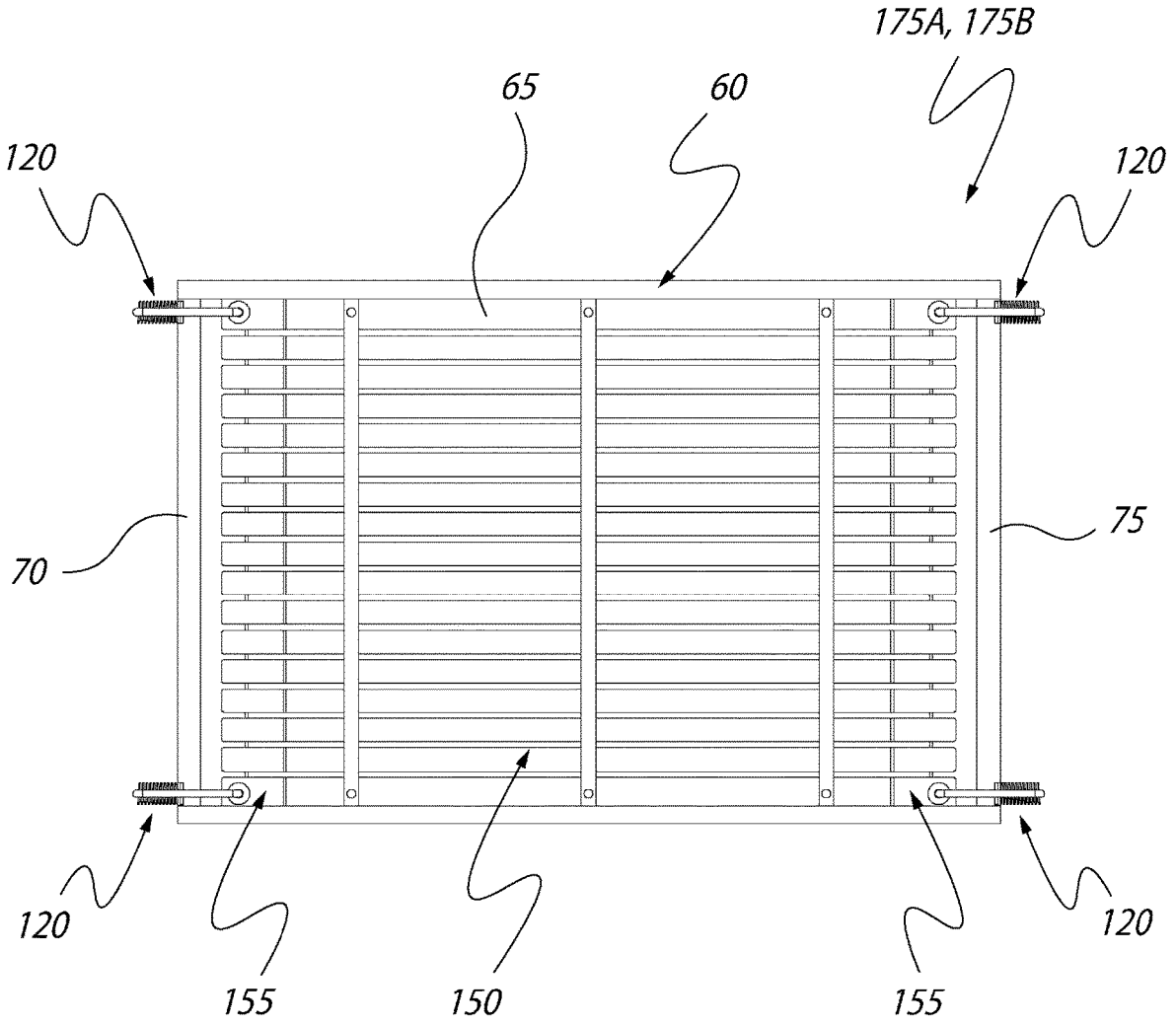
FIG. 15 is a schematic front view of a further toaster heating sub-assembly.
Figure 16:
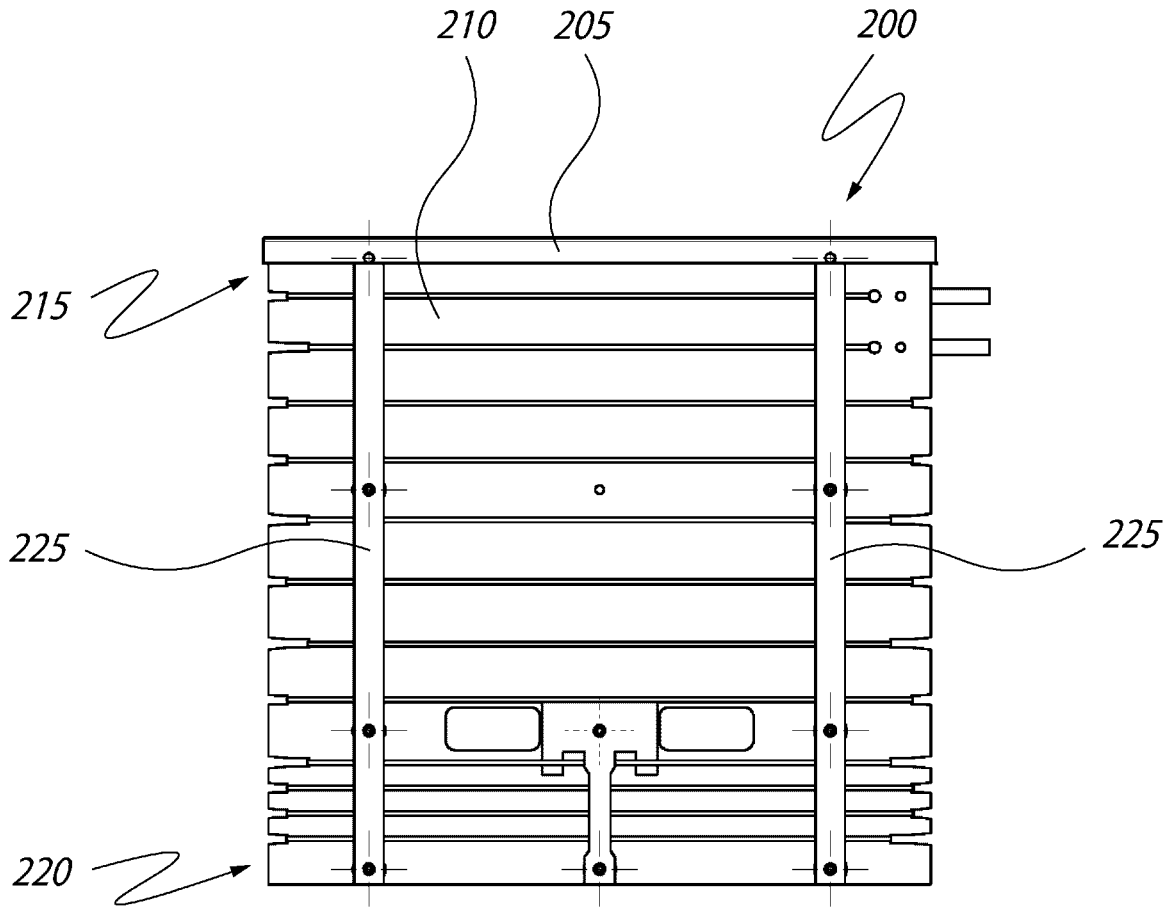
FIG. 16 is a schematic front view of a further toaster heating sub-assembly.

In FIG. 15, there is schematically depicted a further embodiment of a first heating element assembly 175A or a second heating element assembly 175B having a similar functionality to the first and second heating element assemblies 155A and 155B described above. Like reference numerals have been used to describe like features. In this embodiment, however, the first heating element assembly 175A and the second heating element assembly 175B each includes one major panel member 150 and two minor panel members 155. The minor panel members 155 are located adjacent either side of the major panel member 150. Additionally, in this embodiment, the first heating element assembly 175A and the second heating element assembly 175B each include four biasing members 120. Two of the biasing members 120 are located adjacent the first frame side portion 70 to bias one minor panel member 155 towards the first frame side portion 70, and the further two biasing members 120 being located adjacent the second frame side portion 75 of the frame 60 to bias the other minor panel portion 155 towards the second frame side portion 75.

FIGS. 16 to 20 schematically depict a further embodiment of a heating element assembly 200, again with a similar functionality to the heating element assemblies 155A, 155B, 175A and 175B described above. In this embodiment, the heating element assembly 200 includes a frame 205 and a panel 210 at least partly supported by the frame 205. The panel 210 has an upper portion 215 and a lower portion 220, with the frame 205 supporting the panel 210 at the upper portion 215. Similar to the embodiment of the first and second heating element assemblies 55A, 175A and 55B, 175B described above, the frame 205 includes an elongate channel (not shown) within which the upper portion 215 of the panel 210 is mounted.

Figures 17, 18:
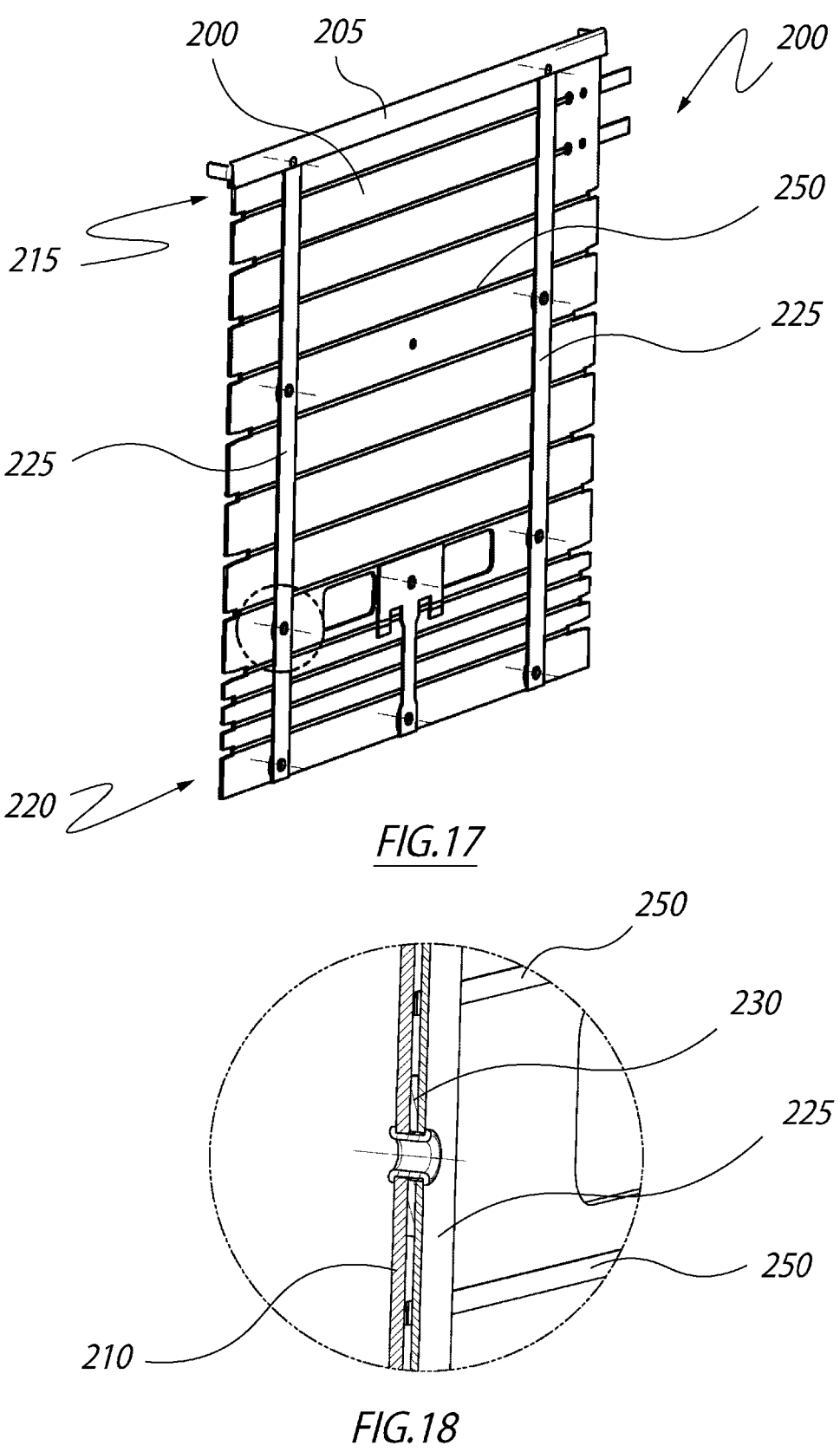
FIG. 17 is a schematic isometric view of the toaster heating sub-assembly of FIG. 16.
FIG. 18 is an enlarged view of a portion of the toaster heating sub-assembly of FIG. 17.
Figure 19:
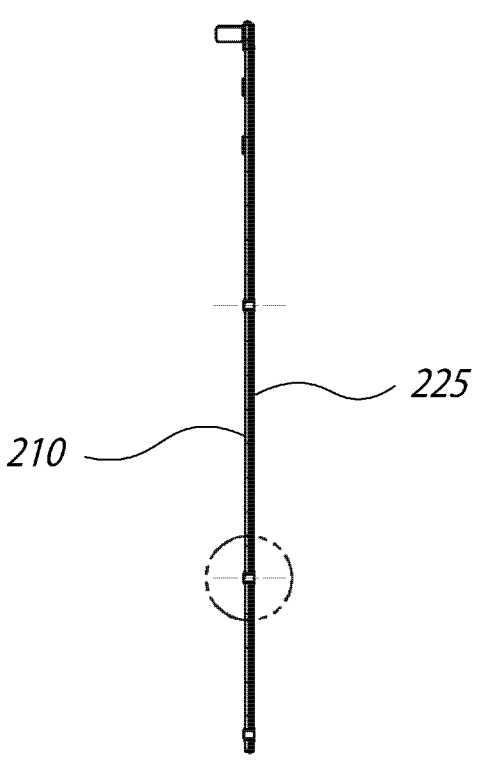
FIG. 19 is a schematic side view of the toaster heating sub-assembly of FIG. 16.
Figure 20:
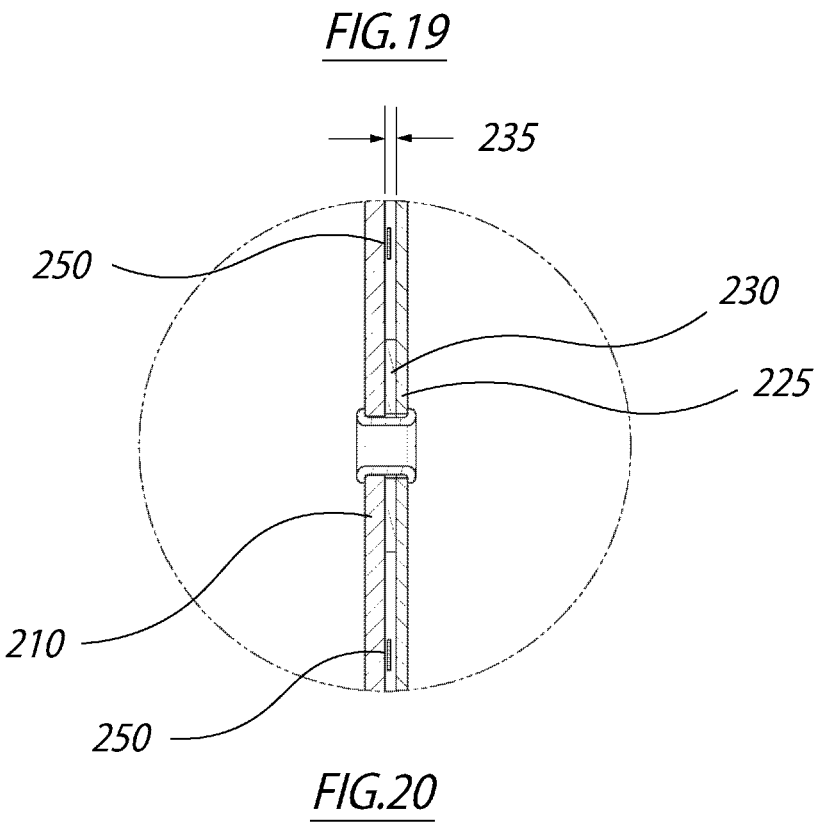
FIG. 20 is an enlarged view of a portion of the toaster heating sub-assembly of FIG. 19.
Figures 21, 22:
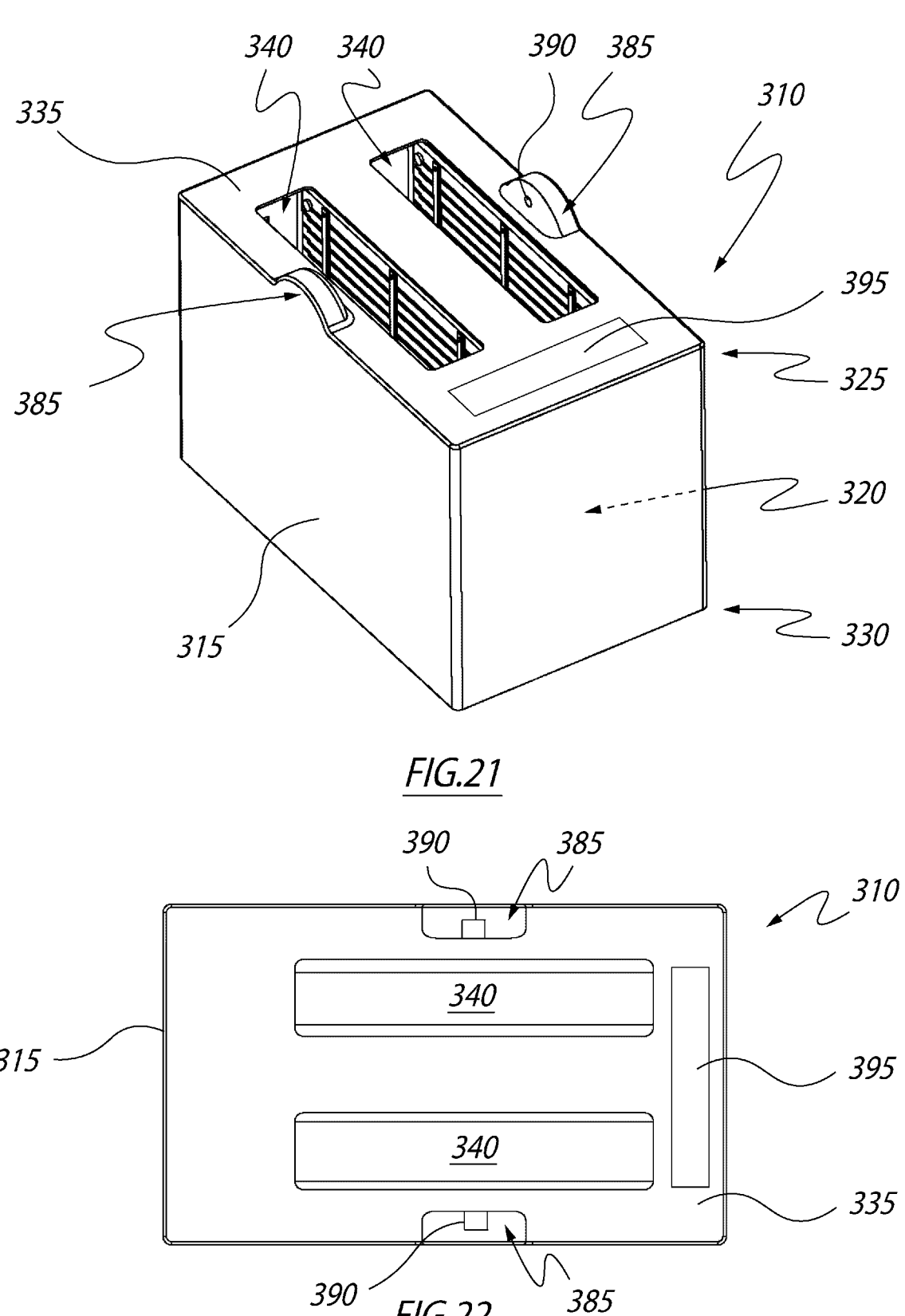
FIG. 21 is a schematic isometric view of a further toaster.
FIG. 22 is a top view of the toaster of FIG. 21.

The heating element assembly 200 includes at least one elongate member 225 mounted to the panel 210. In the depicted embodiment, the heating element assembly 200 includes two elongate members 225 in the form of vertical strips mounted to the panel 210. However, it will be appreciated that in other embodiments (not shown), the heating element assembly 200 may include any number of elongate members 225 to suit the design requirements of the toaster 10. Referring to FIGS. 18 and 20, at least one spacer 230 is provided between each elongate member 225 and the panel 210 to provide a gap 235 therebetween. At least one rivet 240 is also provided to mount each elongate member 225 to the panel 210.

The heating element assembly 200 also includes a heating element 250 that is wound around the panel 210. The heating element 250 is also located within the gap 235 provided by each spacer 230, thus allowing the heating element 250 to slide freely as it expands or contracts.

Toaster Sensor Assembly

In FIGS. 21 to 24, there is schematically depicted a further embodiment of a toaster 310 including a housing 315 that surrounds an interior cavity 320. The interior cavity 320 houses a number of components for receiving and toasting foodstuff.

The housing 315 includes an upper portion 325 and a lower portion 330. The housing 315 also includes a top portion 335 located adjacent the upper portion 325. The top portion 335 provides an upper surface of the toaster 310. In the depicted embodiment, the top portion 335 includes two openings (slots) 340, with each opening 340 providing access into the interior cavity 320. However, in other embodiments (not shown), it will be appreciated that the top portion 335 may include only one opening or slot 340, or more than two openings or slots 340, depending on the design requirements of the toaster 310.

Figure 23:
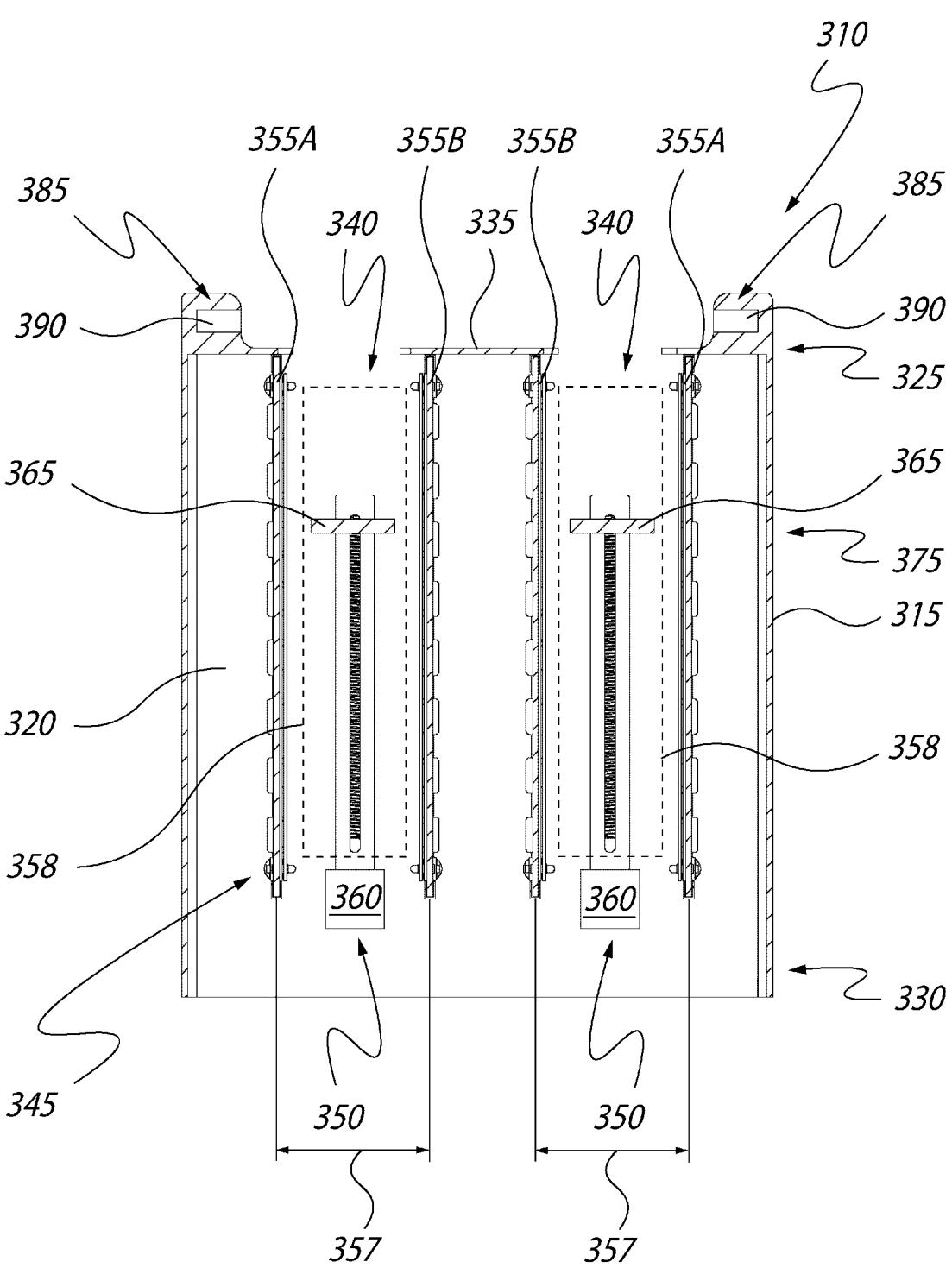
FIG. 23 is a schematic sectioned side view of the toaster of FIG. 21.

Referring to FIG. 23, the toaster 310 further includes a toaster heating assembly 345 located in the interior cavity 320. It would be understood that the toaster heating assembly 345 is mounted within the interior cavity 320, and preferably mounted (either directly or indirectly) to the housing 315. In the depicted embodiment, the toaster heating assembly 345 is mounted to the top portion 335 of the housing 315.

The toaster heating assembly 345 includes two sub-assemblies 350 to complement the two slots 340. It will be appreciated that in other embodiments (not shown), the toaster heating assembly 345 may include only one sub-assembly 350, or more than two sub-assemblies 350, to match the number of slots 340 provided by the top portion 335.

Each sub-assembly 350 includes a pair of opposing heating element assemblies provided by a first heating element assembly 355A and a second heating element assembly 355B. It will be further appreciated that the opposing heating element assemblies may be provided by any one of the heating element assemblies 155A, 155B, 175A, 175B or 200 described above.

In the depicted embodiment, the toaster heating assembly 345 is provided with two spaced apart sub-assemblies 350 which together provide two opposing first heating element assemblies 355A at an outer area of the toaster heating assembly 345, and two opposing second heating element assemblies 355B at an inner area of the toaster heating assembly 345. The two second heating element assemblies 355B are thus spaced apart and located adjacent to each other, whilst the two first heating element assemblies 355A are located towards the housing 315 and spaced from the respective sides of the two second heating element assemblies 355B.

For each sub-assembly 350, the first heating element assembly 355A and the second heating element assembly 355B are spaced by a distance 357 so as to provide a toasting area 358 within the interior cavity 320 for receiving the foodstuff to be toasted.

In the depicted embodiment, the toaster heating assembly 345 is further provided with a motor 360 and a carriage 365 for each sub-assembly 350, with each carriage 365 being individually moveable between the respective opposing heating element assemblies 355A and 355B and to support the foodstuff received in the toasting area 358. The carriages 365 each function in a similar manner to the carriage 165 described above. Each carriage 365 is moveable between a lowered toasting position 370 and raised (inspection) position 375 (see FIG. 24) relative to the respective opposing heating element assemblies 355A and 355B. Each carriage 365 is operatively associated with its respective motor 360 to drive movement of the carriage 365 between their respective lowered and raised positions 370 and 375. It will be appreciated that in some embodiments, for example, as illustrated in the schematic component diagram of FIG. 25, that both carriages 365 are operatively associated with a single motor 360 to drive movement of the carriages 365 between their respective lowered and raised positions 370 and 375.

Figure 24:
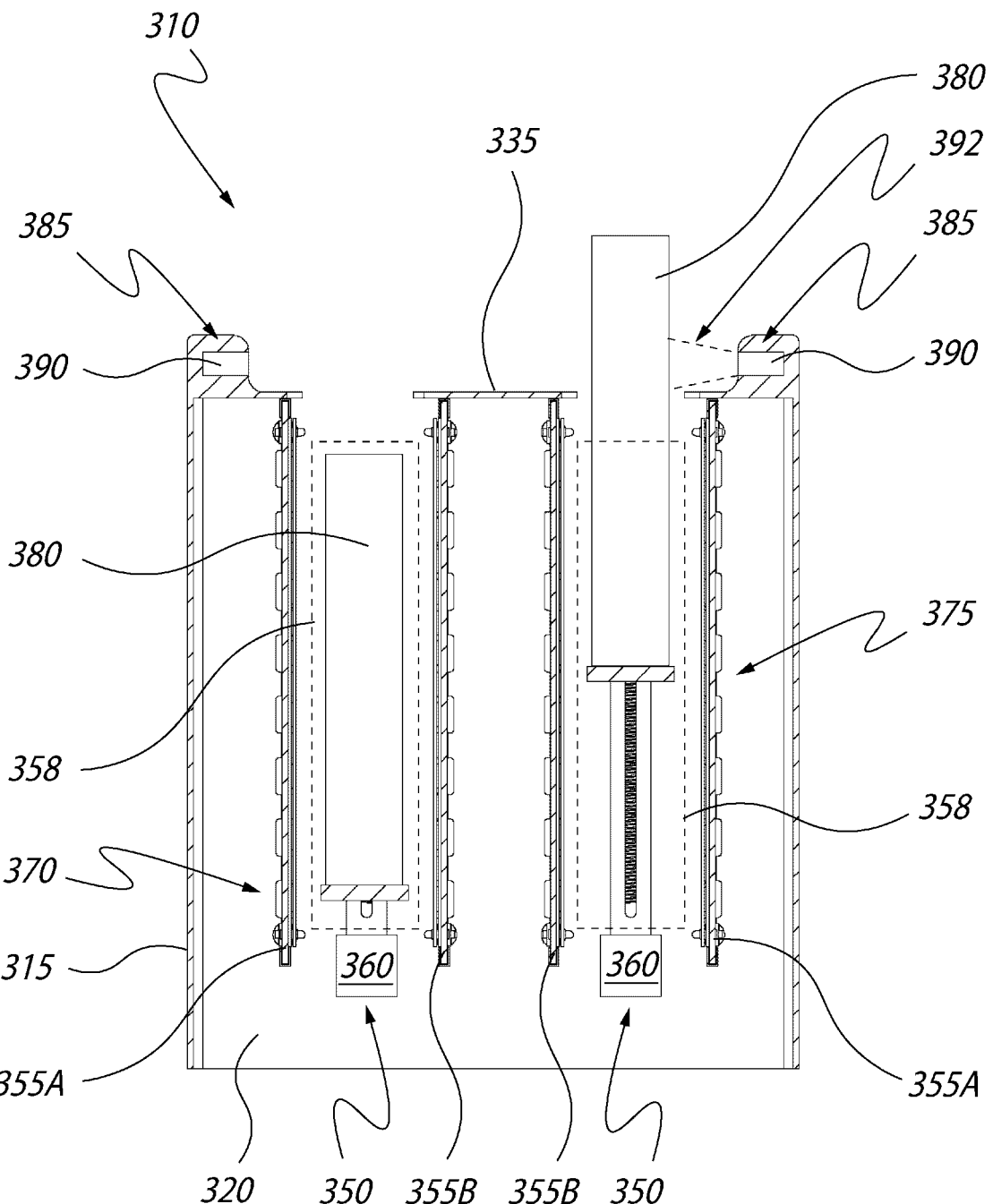
FIG. 24 is a further schematic sectioned side view of the toaster of FIG. 21.
Figure 25:
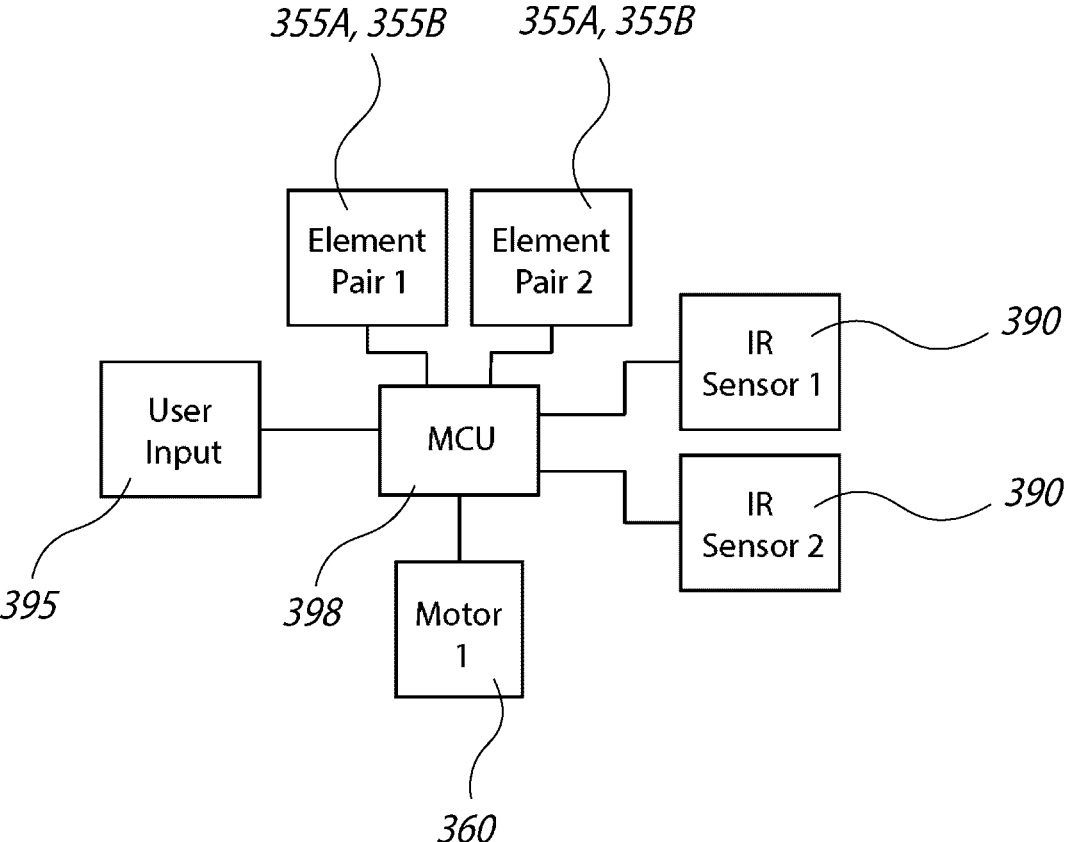
FIG. 25 is a schematic component diagram of the toaster of FIG. 21.

FIG. 23 shows an exemplary embodiment of the toaster heating assembly 345 with both the carriages 365 in the raised position 375, whilst FIG. 24 shows an exemplary embodiment of the toaster heating assembly 345 with one of the carriages 365 in the lowered position 370, and the other one of the carriages 365 in the raised position 375. Additionally, in FIG. 24, exemplary foodstuffs 380 are shown to be located within the toasting area 358 when the respective carriage 365 is in the lowered position 370, whilst in the raised position 375, a portion of the foodstuff 380 may be outside of the toasting area 358.

In the depicted embodiment, the toaster 310 further includes two opposing sensor assemblies 385 located away from the toasting area 358. In a preferred form, the sensor assemblies 385 are each located above the toasting area 358. The sensor assemblies 385 are mounted to an upper surface of the toaster 310 (at the top portion 335 of the housing 315). It will be appreciated that the sensor assemblies 385 may alternatively be mounted to any other location on the toaster 310, for example, on an underside of the top portion 335 but still above the toasting area 358.

Each sensor assembly 385 includes a sensor device 390 to detect a surface temperature of the foodstuff 380 supported by the respective carriage 365 when the carriage 365 is in the raised position 375. In a preferred form, the sensor device 390 is a contactless temperature sensor (such as an infrared (IR) sensor) that is configured to measure a surface temperature of the foodstuff 380. It is envisaged that the sensor device 390 may alternatively be in the form of a thermal camera or a thermopile array. Referring to FIG. 24, for example, when the carriage 365 is in the raised position 375, the foodstuff 380 is brought into a field of view 392 of the sensor device 390. As the sensor device 390 is located away from and above the toasting area 358, the sensor device 390 is thus able to take a direct surface temperature measurement of the foodstuff 380, without the need to account for ambient temperature inside the toasting area 358. Additionally, by locating the sensor device 390 away from and above the toasting area 358, the likelihood of particle build-up (for example, from crumbs or debris from the foodstuff 380) on the sensor device 390 may be reduced. It will also be appreciated that the field of view 400 of the sensor device 390 is oriented generally parallel to the horizontal upper surface of the toaster 310, which assists in reducing the likelihood of the sensor device 390 catching and retaining any particles that may obstruct the field of view 392.

The toaster 310 may additionally include a user interface 395 located, for example, on the top portion 335 of the toaster housing 315. The user interface 395 may receive input from the user to send a corresponding signal to a microprocessor 398 (see FIG. 25), which is in turn operatively associated with the heating element assemblies 355A and 355B (to control the energisation or de-energisation of toaster heating elements) and the motors 360 (to control movement of the carriages 365). The microprocessor 398 may be configured to receive a temperature signal from the sensor device 390 control the heating element assemblies 355A, 355B and the motors 360.

Figure 26:
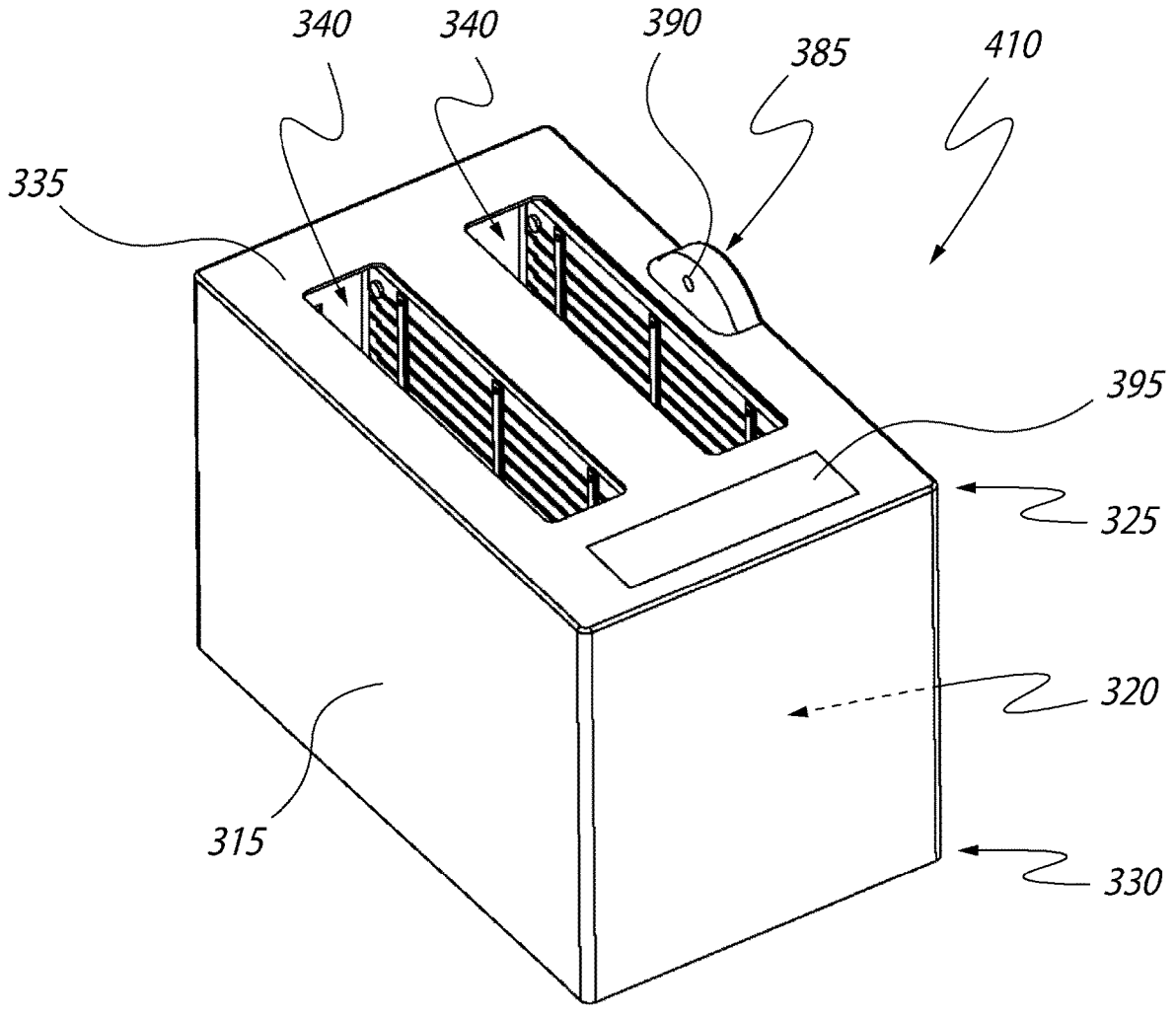
FIG. 26 is a schematic isometric view of a further toaster.
Figure 27:
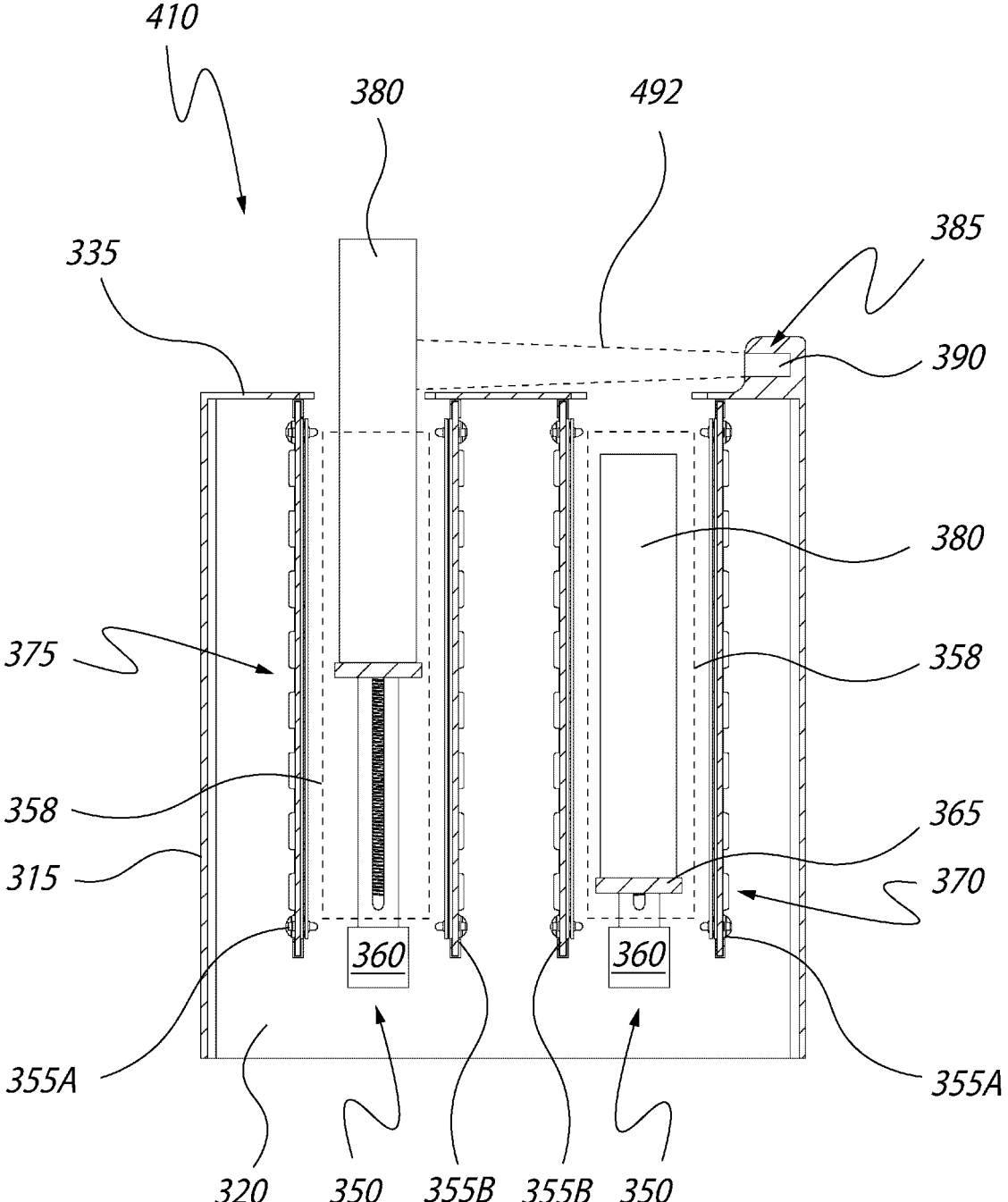
FIG. 27 is a schematic sectioned side view of the toaster of FIG. 26.
Figure 28:
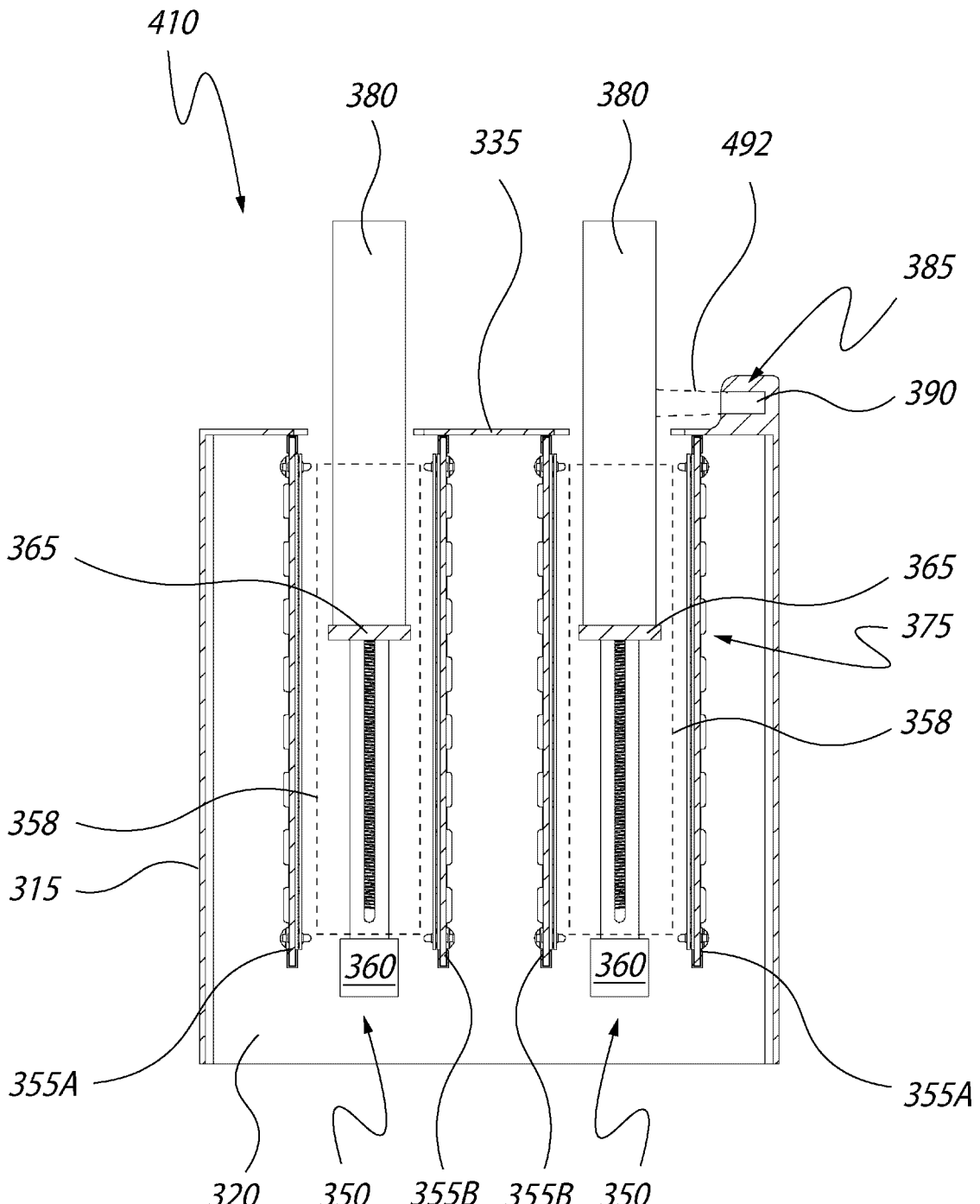
FIG. 28 is a further schematic sectioned side view of the toaster of FIG. 26.
Figure 29:
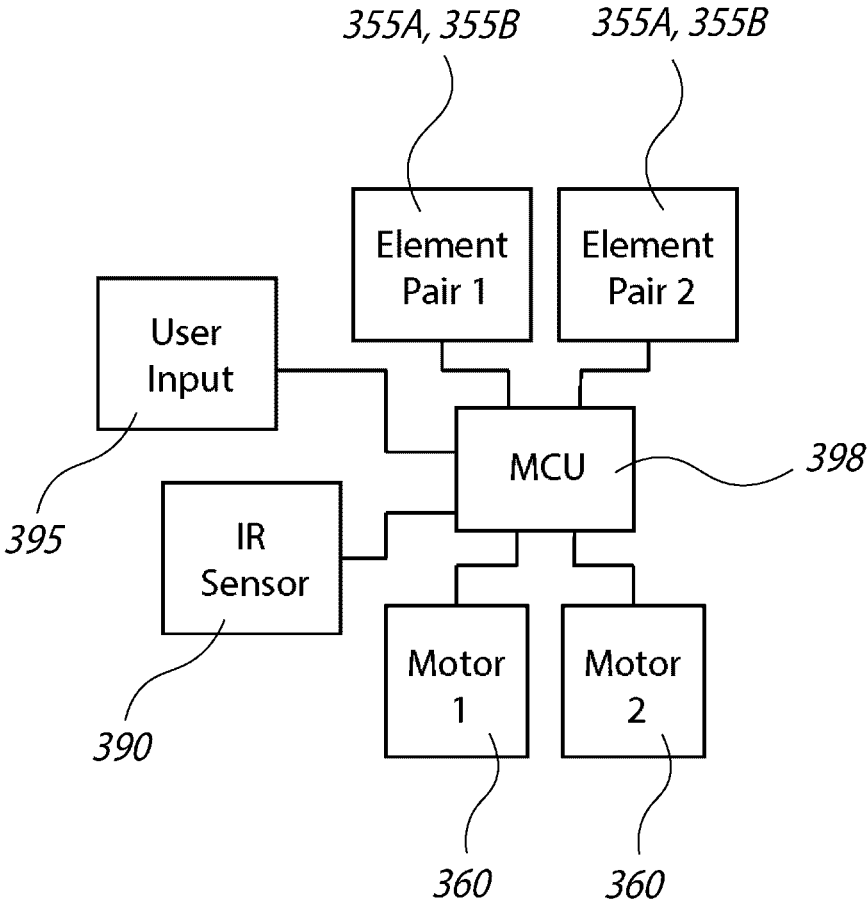
FIG. 29 is a schematic component diagram of the toaster of FIG. 26.

In FIGS. 26 to 28, there is schematically depicted a further embodiment of a toaster 410, which operates in a similar manner to the toaster 310 described above, with like reference numerals being used to indicate like features. However, this embodiment of the toaster 410 includes only one sensor assembly 385 having only one sensor device 390. In this embodiment sensor device 390 has an extended field of view 492 such that the sensor device 390 is able to detect a surface temperature of the foodstuff 380 supported by either one of the carriages 365 when said carriage 365 is in the raised position 375.

FIG. 27 shows an exemplary embodiment of the toaster heating assembly 345 with one of the carriages 365 in the lowered position 370 and the other one of the carriages 365 in the raised position 375. FIG. 28 shows an exemplary embodiment of the toaster heating assembly 345 with both of the carriages 365 in the raised position 375. It will be appreciated that the microprocessor 398 is programmable to send a signal to the motors 160 to enable the movement of the two carriages 365 separately and sequentially. Accordingly, the detection of the surface temperature of the food-stuff 380 supported on the two carriages 365 may be staggered. For example, with reference to FIG. 27, the microprocessor 398 may be programmable to firstly enable the movement of the carriage 365 on the left side (located further away from the sensor device 390) to the raised position 375, and then enable the detection of the surface temperature of the foodstuff 380 supported by said left-side carriage 365. Referring next to FIG. 28, the microprocessor 398 be programmable to subsequently enable the movement of the carriage 365 on the right side (located closest to the sensor device 390) to the raised position 375, and then enable the detection of the surface temperature of the foodstuff 380 supported by said right-side carriage 365. The microprocessor 398 is also programmable to send a signal to energise the two opposing heating element assemblies 335A and 335B separately and sequentially.

It will be appreciated that separating the control of the carriage, sensor device and heating elements of the two sub-assemblies may allow two different types of foodstuff to be toasted to an ideal, or desired toasting level. For example, one of the carriages may be supporting a frozen slice of bread, while the other one of the carriages may be supporting a non-frozen slice of bread. As non-frozen slice of bread may reach the desired toasting level before the frozen slice of bread, the heating elements surrounding the non-frozen slice of bread may be de-energised first to prevent over-toasting.

Figure 30:
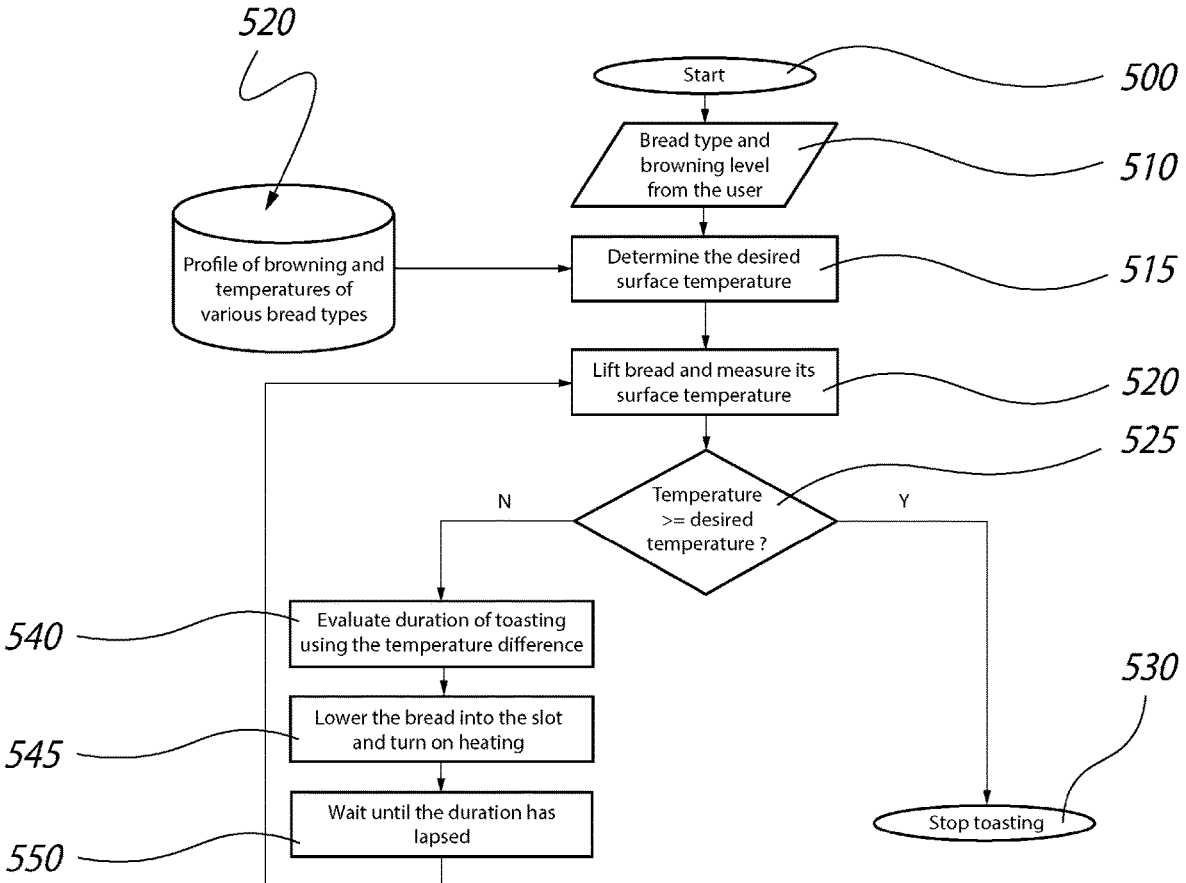
FIG. 30 is a schematic view of an operation logic of the toaster of FIGS. 21 and 26.

An operation logic of the toaster above embodiments described will now be described with reference to FIG. 30.

At step 500, a user enables operation of the toaster and at step 510, selects, by providing one or more inputs into the user interface, a type of foodstuff to be toasted and/or a desired level of browning of the foodstuff.

At step 515, the microprocessor determines the desired surface temperature of the foodstuff based on pre-programmed browning profiles and temperatures of various foodstuff types. The microprocessor then sends a signal to energise the heating elements and to begin a toasting cycle.

At step 520, the microprocessor sends a signal to the motor to enable the movement of one of the carriages to the raised position, and to enable the sensor device to detect a surface temperature of the foodstuff supported on the carriage.

At step 525, if the surface temperature detected by the sensor device is greater than or equal to the desired surface temperature, then the microprocessor sends a signal to disable operation of the toaster at step 530.

If, at step 525, the surface temperature detected by the sensor device is less than the desired surface temperature, then the microprocessor evaluates, at step 540, a duration of further toasting (using, for example, the difference between the detected and desired surface temperatures).

At step 545, the microprocessor sends a signal to enable the movement of the carriage to the lowered position, whereby at step 550, the foodstuff supported by the carriage is toasted for the duration of further toasting determined at step 540.

Upon elapsing of the duration of further toasting, step 520 is re-visited with the microprocessor sending a signal to enable the movement of the carriage to the raised position, and to enable the sensor device to detect the surface temperature of the foodstuff supported on the carriage. This process may be repeated to achieve a detected surface temperature that is greater than or equal to the desired surface temperature, whereupon operation of the toaster may be disabled by de-energising the heating elements.

It will be appreciated that as the surface temperature of the foodstuff is being detected by the sensor device, the microprocessor may record and save the surface temperature values to create a custom user profile. This may at least allow the user to create a specific temperature profile of a foodstuff according to their preference, or to create a specific temperature profile of a non-typical foodstuff (for example, homemade bread) that may not be covered by a pre-programmed set of values.

Various forms of the toasters described above may have one or more of the following advantages. For example, the arrangement of the biasing member and the spacer assemblies may at least allow the heating element portions to be spaced apart from the panel, and to remain under tension during expansion and contraction from heating up and cooling down. The heating element portions also remain parallel and evenly spaced apart from one another during expansion and contraction from heating up and cooling down. This arrangement may thus reduce cool zones within the toasting area, thereby creating an even distribution of heat to the foodstuff being toasted. This arrangement may also minimise repeated deformation of the heating elements from repeated expansion and contraction, thereby lessening fatigue of the heating elements over time.

Additionally, the arrangement of the sensor assemblies may at least allow the direct (true) surface temperature of the foodstuff to be detected, as the sensor assemblies are positioned away from (and preferably above) the toasting areas. This arrangement thus prevents the sensor devices from being subjected to high temperatures from the toaster heating elements, which may at least prolong the life span of the sensor devices. The position of the sensor devices away from (and preferably above) the toasting areas also reduces the likelihood of particle build-up in the sensor devices, which may otherwise obstruct the sensor field of view and result in less accurate temperature detection.

Although the invention has been described with reference to preferred embodiments, it will be appreciated by those persons skilled in the art that the invention may be embodied in many other forms.

The invention claimed is:

1. A toaster heating assembly including:
a frame;
a panel at least partly supported by the frame;
a spacer mounted to the panel; and
an elongate heating element having a plurality of spaced apart elongate heating element portions supported by the spacer, so that the spacer is located between the plurality of heating element portions and the panel to provide a gap between the plurality of heating element portions and the panel.

2. The toaster heating assembly of claim 1, further including a biasing member to provide tension to the heating element.

3. The toaster heating assembly of claim 2, wherein the biasing member includes a tensioning arm and a spring.

4. The toaster heating assembly of claim 2, wherein the heating element includes a first side portion mounted to the panel and a second side portion that is moveable relative to the first side portion, and the biasing member extends between the second side portion and one side of the frame so as to bias the second side portion towards said frame side.

5. The toaster heating assembly of claim 4, wherein the panel includes a major panel portion to which the first side portion of the heating element is mounted, and a minor panel portion to which the second side portion of the heating element is mounted, with the major panel portion being fixed relative to said frame side and the minor panel portion being moveable relative to said frame side to vary a distance between the major panel portion and the minor panel portion.

6. The toaster heating assembly of claim 5, wherein the panel includes opposing side portions, each side portion having a plurality of spaced apart openings within which the heating element portions are mounted.

7. The toaster heating assembly of claim 5, wherein the frame includes an elongate inner channel to receive a portion of the minor panel portion to guide the movement of the minor panel portion relative to the frame.

8. The toaster heating assembly of claim 1, wherein the spacer is a spacer assembly including an inner spacer and an outer spacer, wherein the inner spacer is located between the plurality of heating element portions and the panel, and wherein the outer spacer helps retain the heating element portions in place.

9. The toaster heating assembly of claim 8, wherein the spacer assembly is elongate and includes a first end portion mounted at an upper portion of the panel and a second end portion mounted at a lower portion of the panel.

10. A toaster including the toaster heating assembly of claim 1, wherein the toaster includes a housing having an interior cavity, and the toaster heating assembly is located in the interior cavity.

11. The toaster of claim 10, wherein the toaster heating assembly includes two of the elongate heating elements, wherein the two elongate heating elements are spaced apart to provide a toasting area within the cavity for receiving foodstuff to be toasted.

12. The toaster of claim 11, further including a carriage moveable between the opposing heating elements and to support the foodstuff received in the toasting area, the carriage being moveable between a lowered toasting position and raised inspection position relative to the heating elements.

13. The toaster of claim 12, further including a microprocessor to enable the movement of the carriage between the lowered toasting position and the raised inspection position, whereby the microprocessor is programmable to stagger the movement of the carriage from the lowered toasting position to the raised inspection position.

* * * * *